United States Patent [19]

Reinsch et al.

[11] Patent Number: 5,335,961
[45] Date of Patent: Aug. 9, 1994

[54] VEHICLE ROOF WITH A SERIES OF PLATES

[75] Inventors: Burkhard Reinsch, Neuried; Peter Reihl, Starnberg, both of Fed. Rep. of Germany

[73] Assignee: Webasto Karosseriessysteme GmbH, Stockdorf, Fed. Rep. of Germany

[21] Appl. No.: 940,217

[22] Filed: Sep. 8, 1992

[30] Foreign Application Priority Data

Sep. 7, 1991 [DE] Fed. Rep. of Germany ....... 4129860

[51] Int. Cl.⁵ .............................................. B60J 7/047
[52] U.S. Cl. .................... 296/213; 296/214; 296/220; 296/223; 296/224
[58] Field of Search ............... 296/213, 214, 216, 220, 296/223, 224, 219

[56] References Cited

U.S. PATENT DOCUMENTS

| | | | |
|---|---|---|---|
| 2,861,836 | 11/1958 | Goeggel | 296/223 X |
| 3,904,239 | 9/1975 | Jardin | 296/91 X |
| 4,537,442 | 8/1985 | Jardin | 296/221 |
| 4,664,439 | 5/1987 | Schaetzler et al. | 296/213 |
| 4,867,220 | 9/1989 | Matsumoto et al. | 296/219 |
| 4,923,244 | 5/1990 | Clenet | 296/214 |
| 5,052,746 | 10/1991 | Reihl et al. | 296/217 |

FOREIGN PATENT DOCUMENTS

| | | | |
|---|---|---|---|
| 0309775 | 4/1989 | European Pat. Off. | 296/220 |
| 1811690 | 9/1959 | Fed. Rep. of Germany . | |
| 3426998 | 1/1986 | Fed. Rep. of Germany . | |
| 3532150 | 10/1986 | Fed. Rep. of Germany . | |
| 3810888 | 10/1988 | Fed. Rep. of Germany . | |
| 3904486 | 3/1990 | Fed. Rep. of Germany . | |
| 4039583 | 6/1991 | Fed. Rep. of Germany . | |
| 1108992 | 1/1956 | France | 296/219 |
| 1124226 | 10/1956 | France | 296/214 |
| 0048229 | 3/1984 | Japan | 296/220 |
| 463048 | 3/1937 | United Kingdom | 296/220 |
| 573355 | 11/1945 | United Kingdom . | |
| 2113623 | 8/1983 | United Kingdom | 296/220 |
| 2124558 | 2/1984 | United Kingdom . | |
| 2221198 | 1/1990 | United Kingdom . | |

*Primary Examiner*—Dennis H. Pedder

[57] ABSTRACT

A vehicle roof for closing an aperture in a fixed roof surface comprising a series of strip-like plates. In closing the roof, the plates lie edge to edge to form a flat sheet. The plates are mounted on guide tracks in a roof frame fixed beneath the roof surface around the aperture. Each plate is carried on the guide tracks at two locations, and the plates can be moved rearwards and tilted. In the roof open position, the plates are pivoted upward and lie substantially parallel to one another. The pivoting takes place towards the rear of the aperture as each plate is completing its rearward movement. The plates remain engaged with both guide track locations at all times and this ensures the stability of the assembly. In each case, a drip molding is hinged at least on a part of the plates. The drip moldings are guided to slide along lengthwise guideways, and they take part only in the sliding movements of the respective plates, not their pivoting. The drip moldings lie under a lengthwise edge of the plates that extends crosswise to the direction of displacement in each position of the respective plate, and with pivoting of the plate remains below the lower of the lengthwise edges of the respective plate.

37 Claims, 20 Drawing Sheets

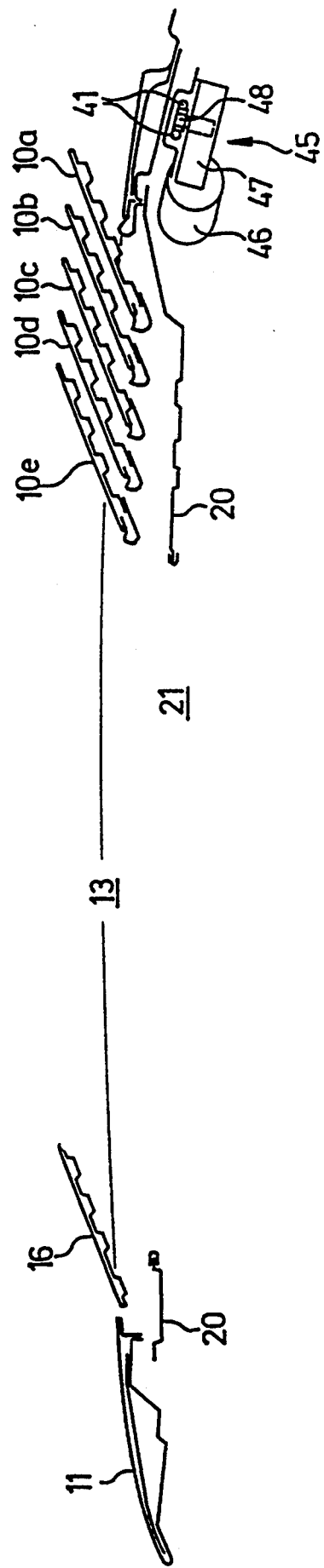
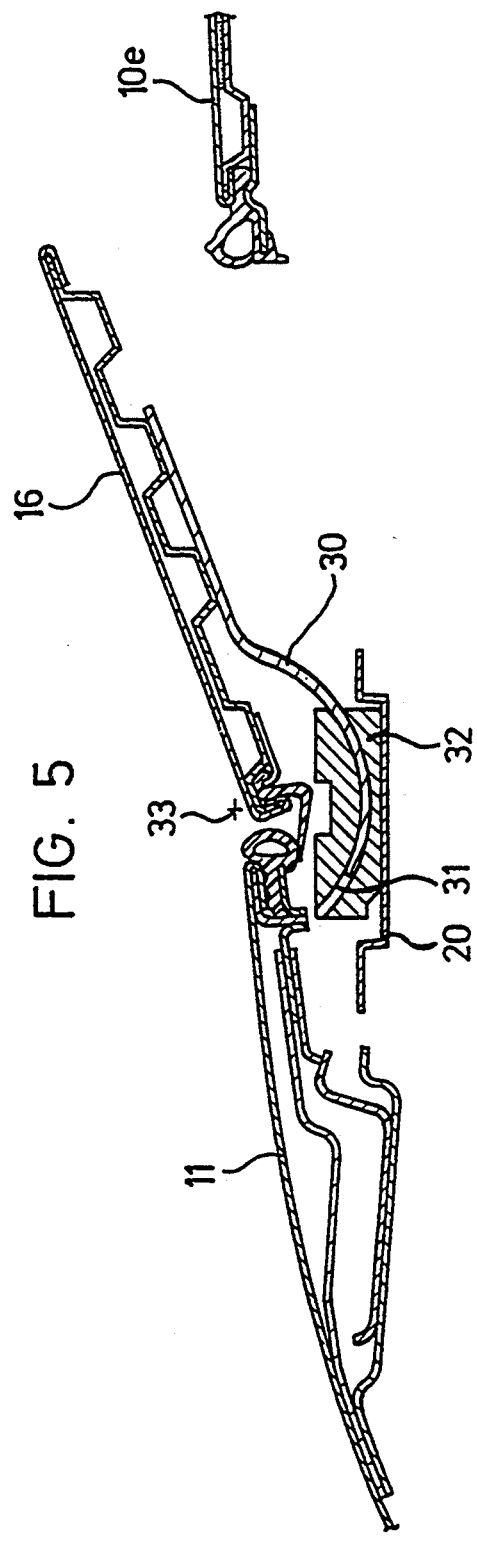
FIG. 4
FIG. 5

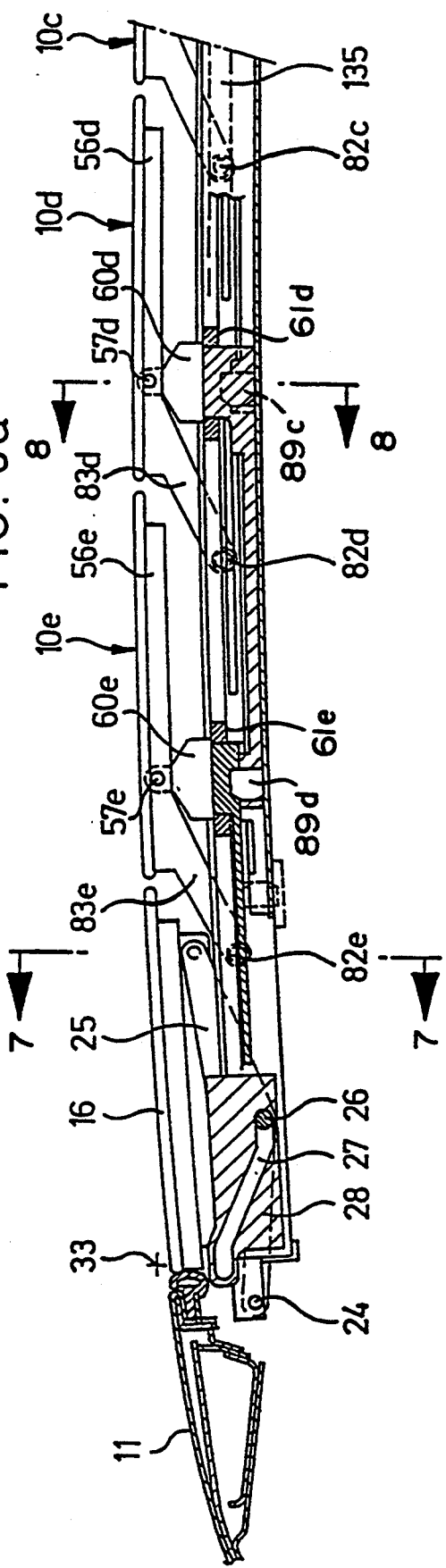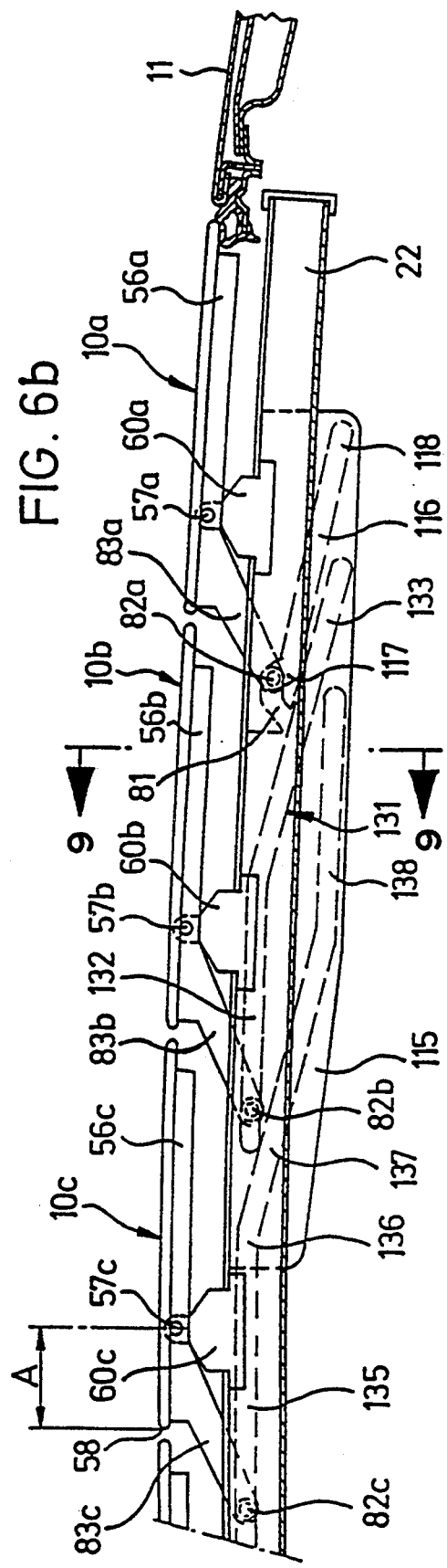

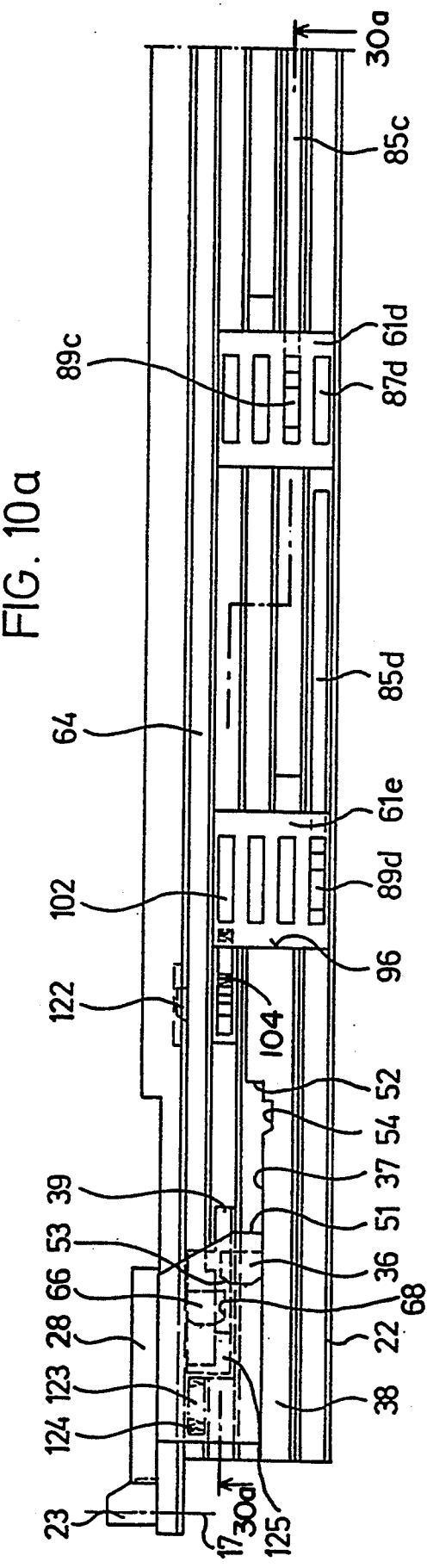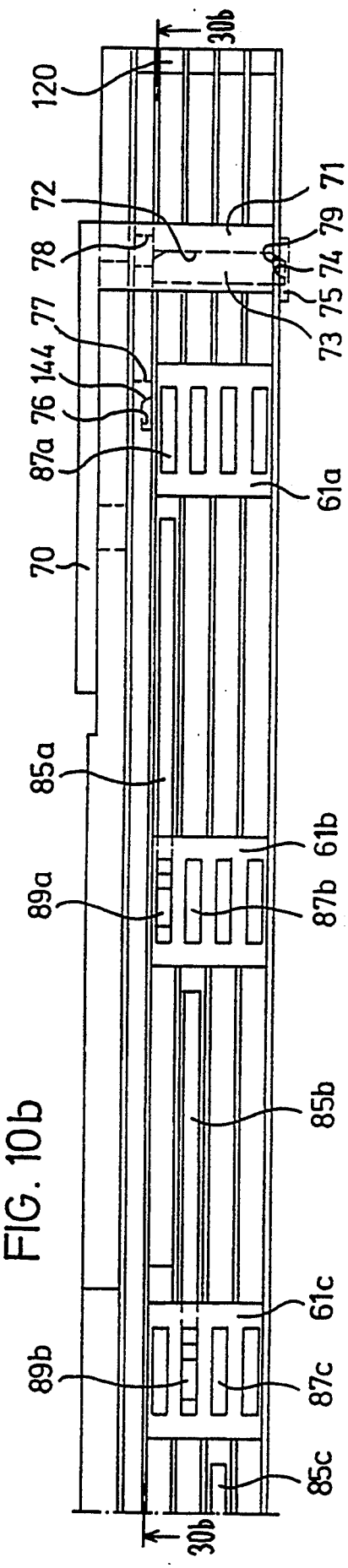

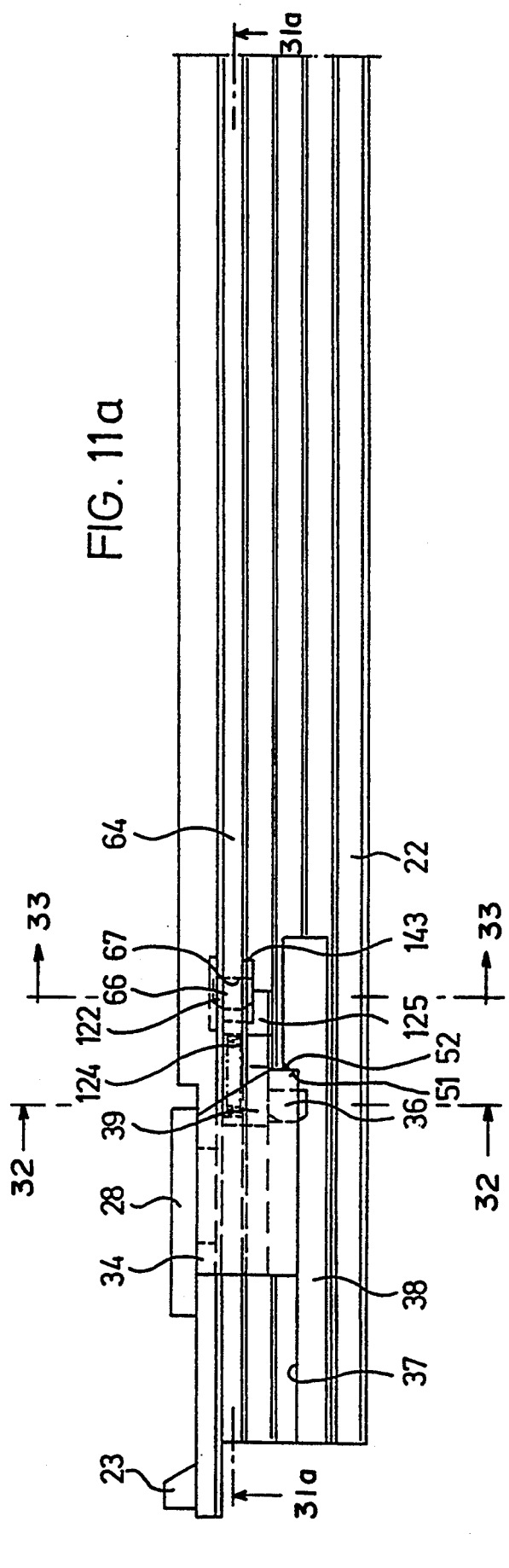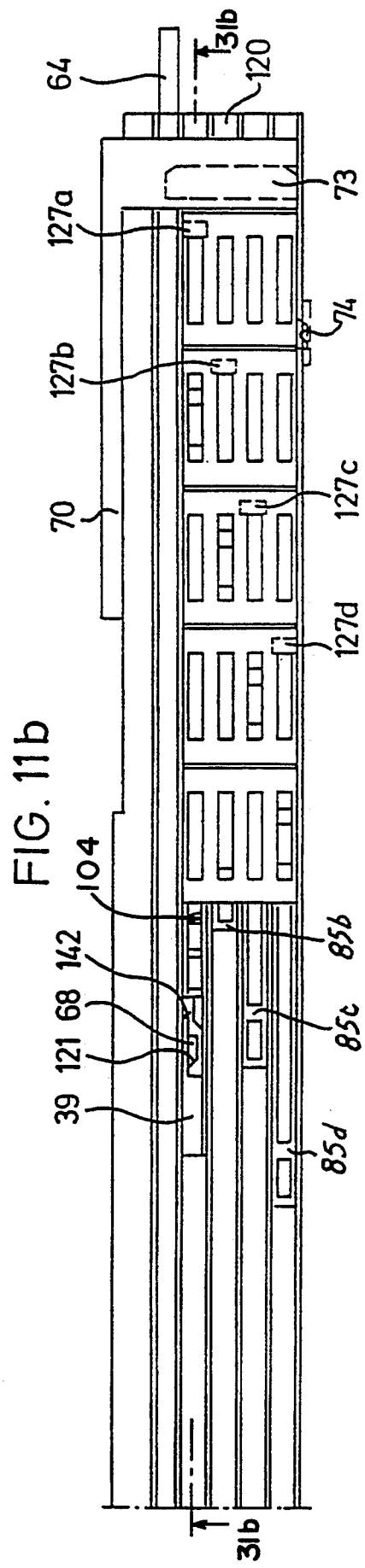

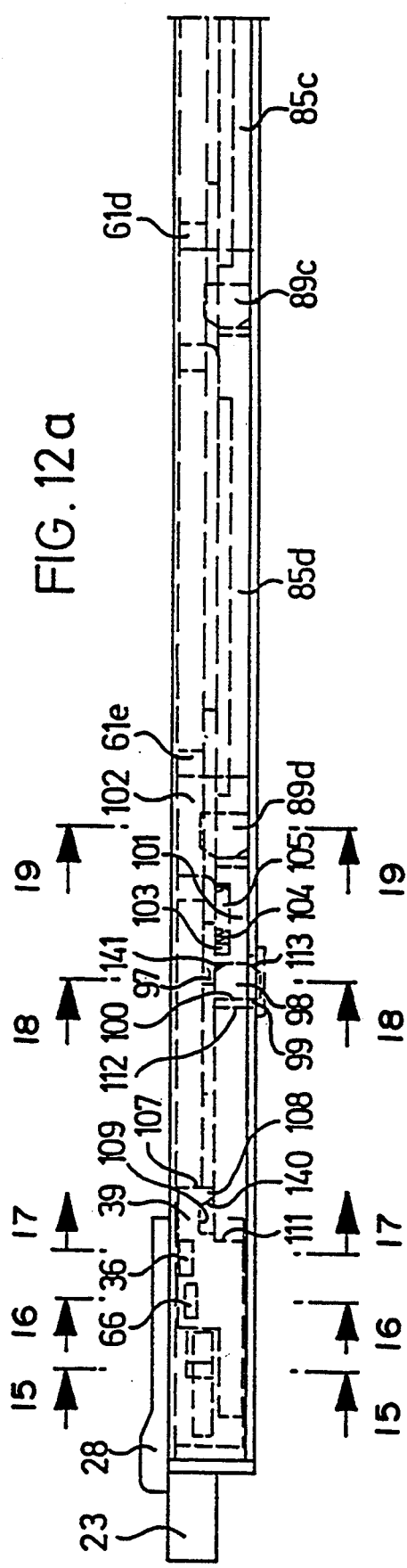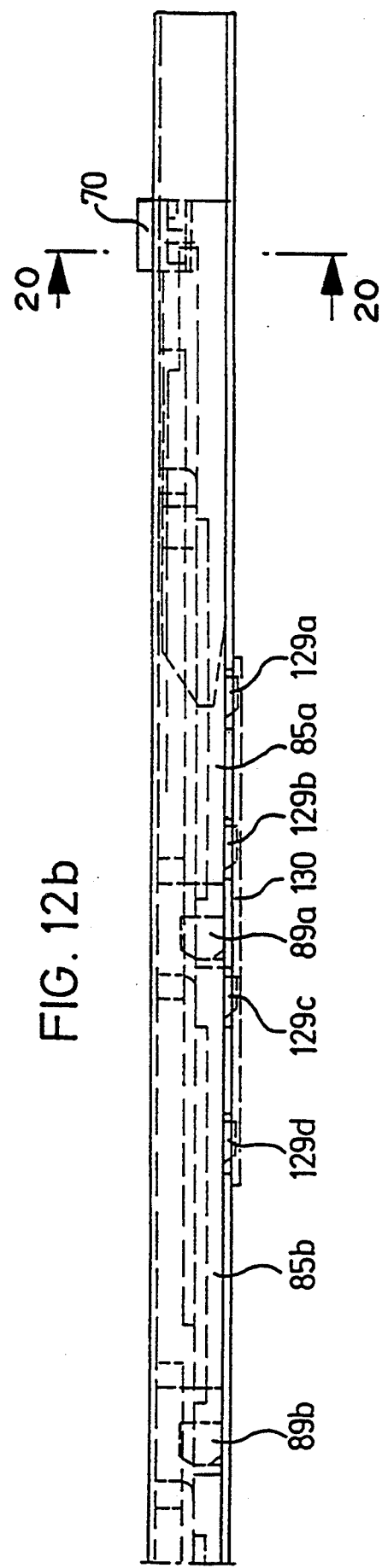

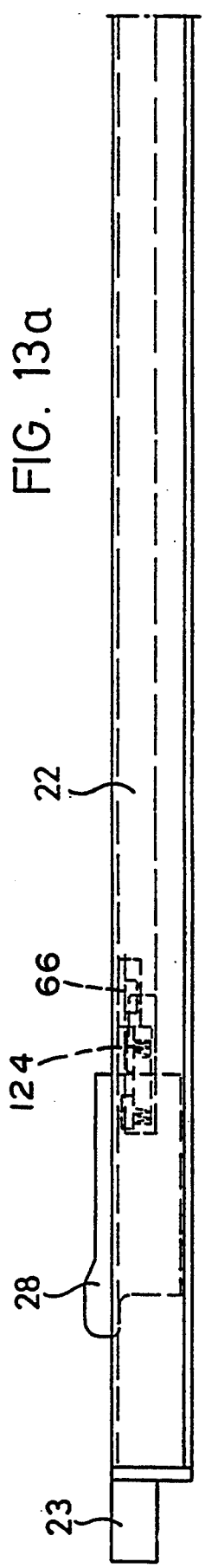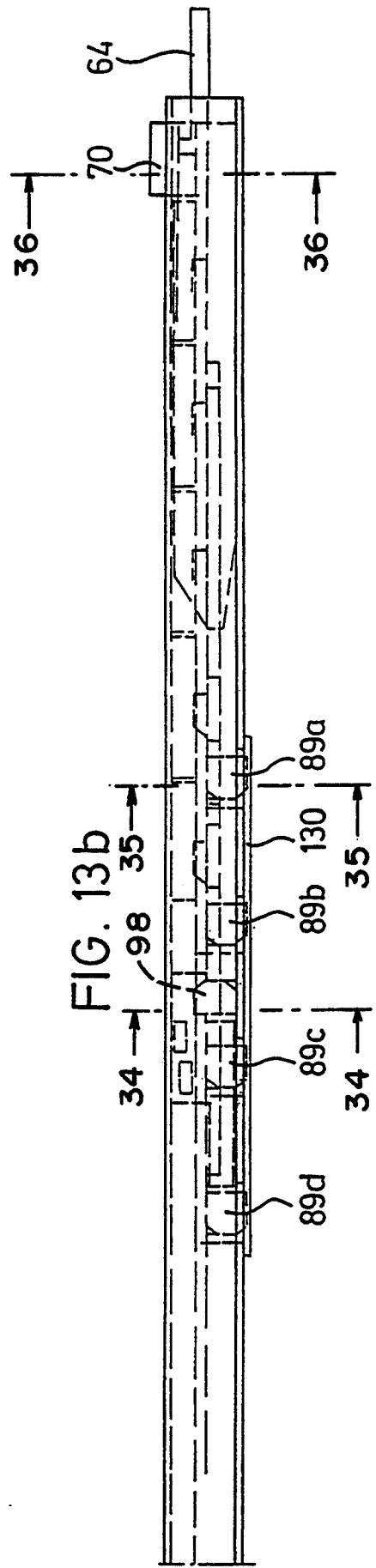

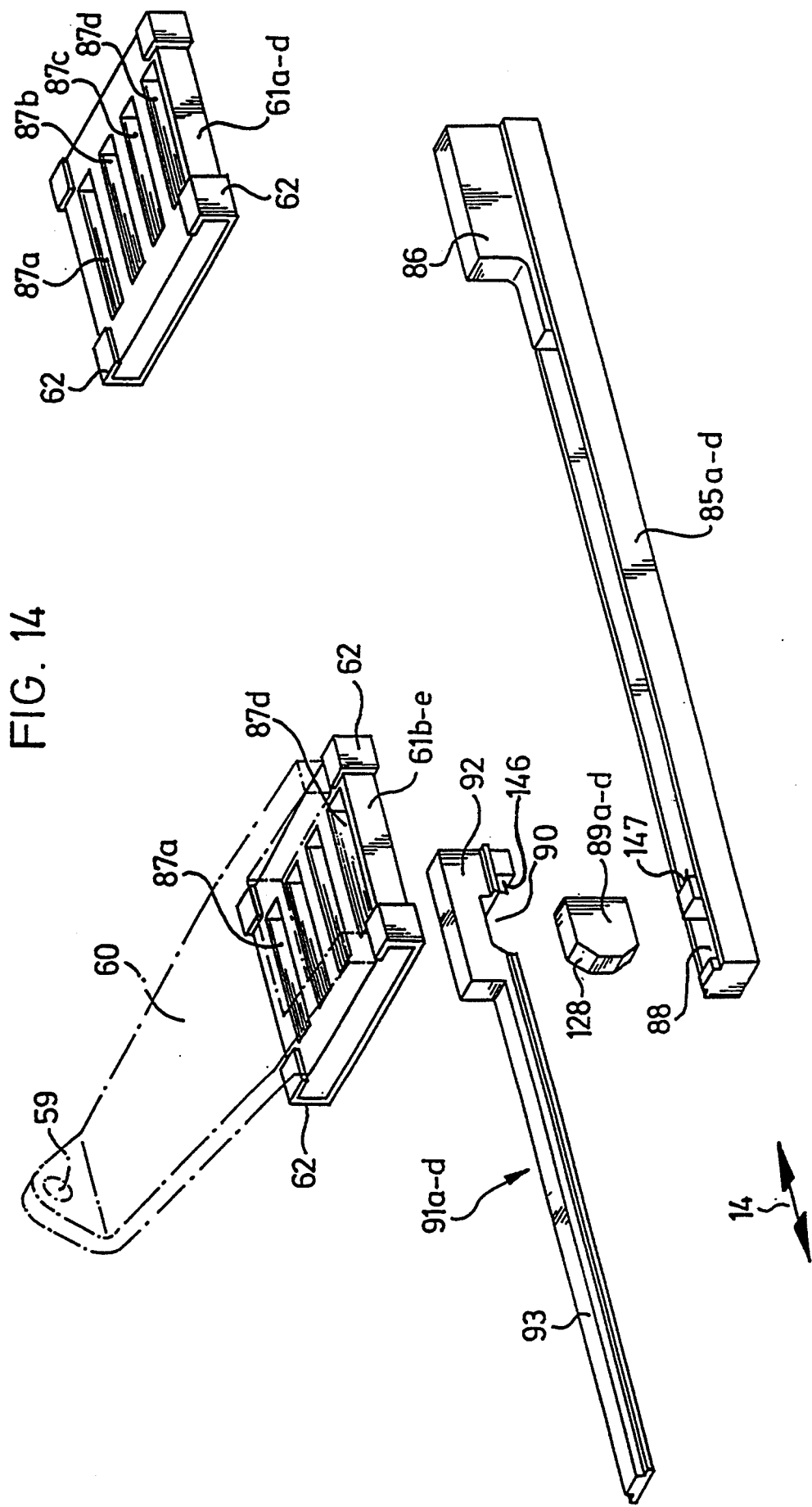

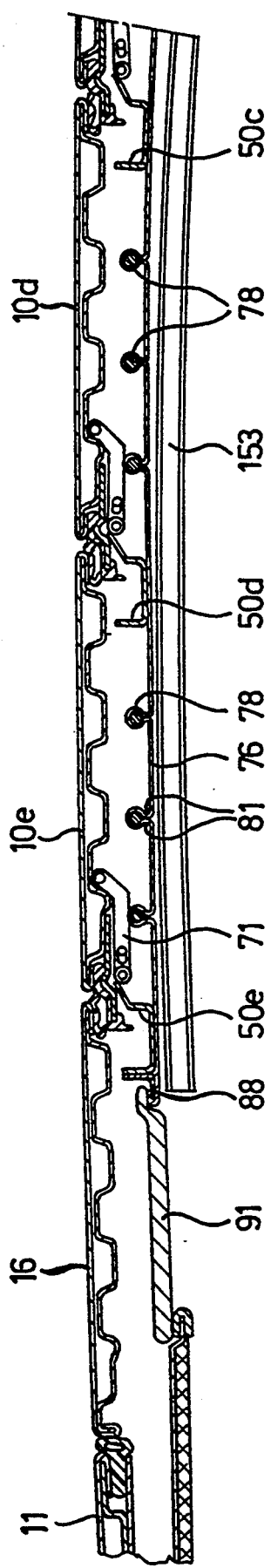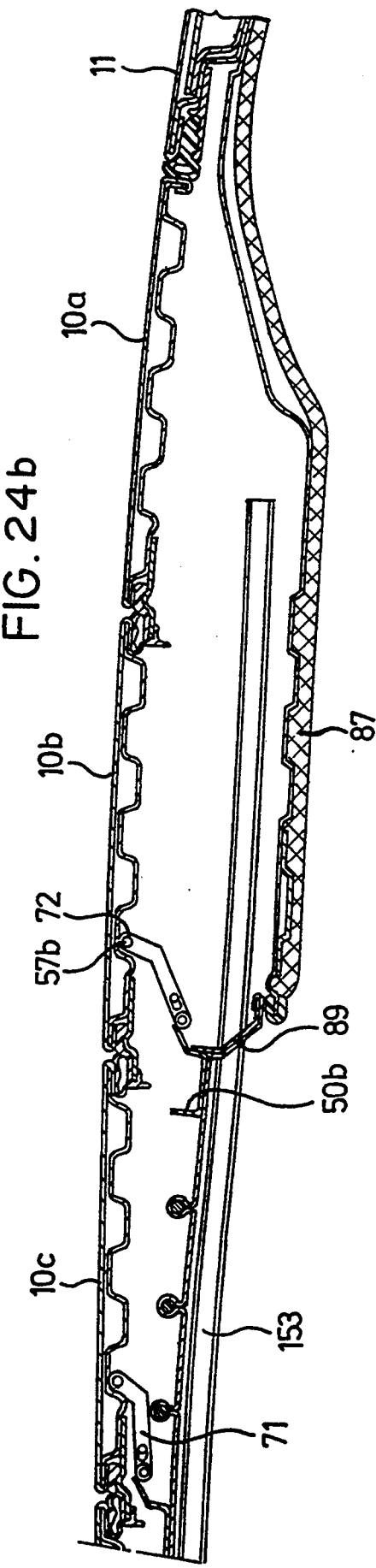

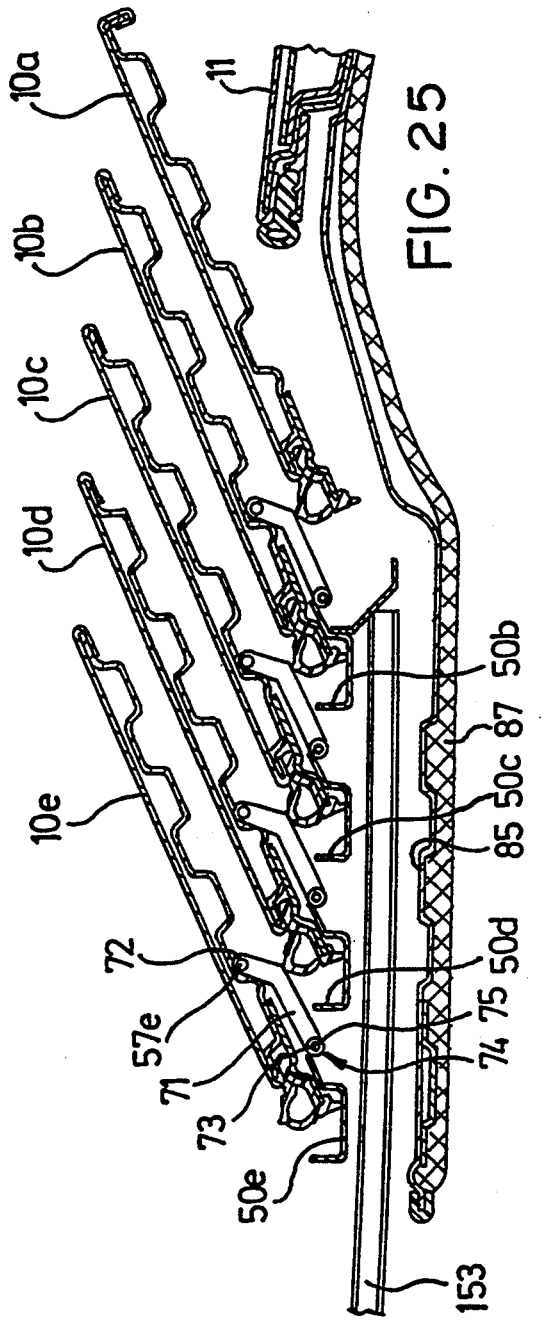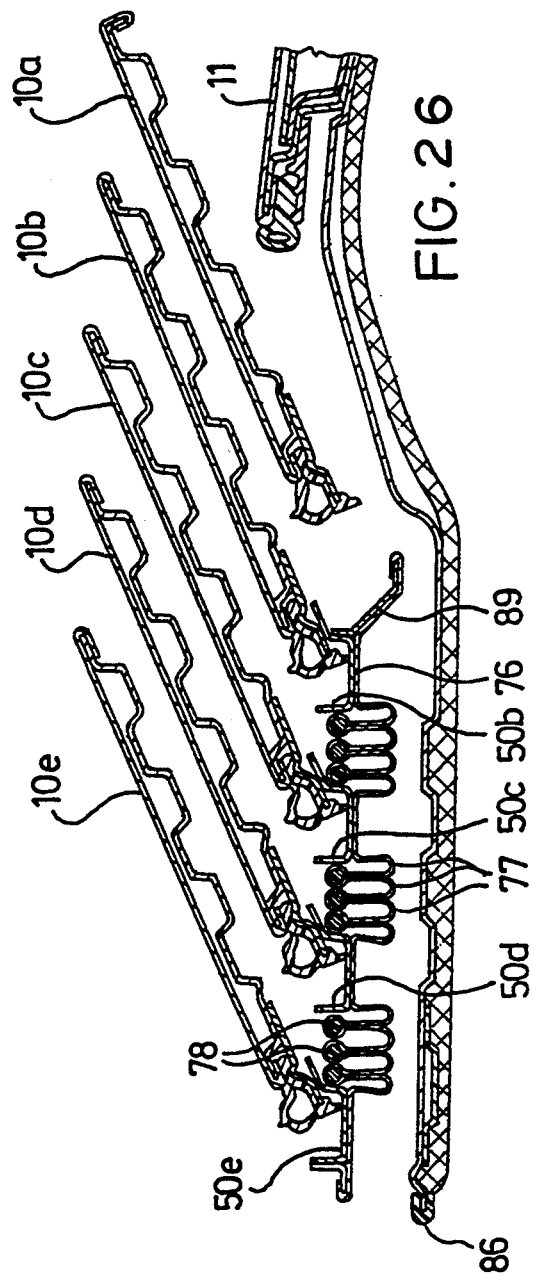

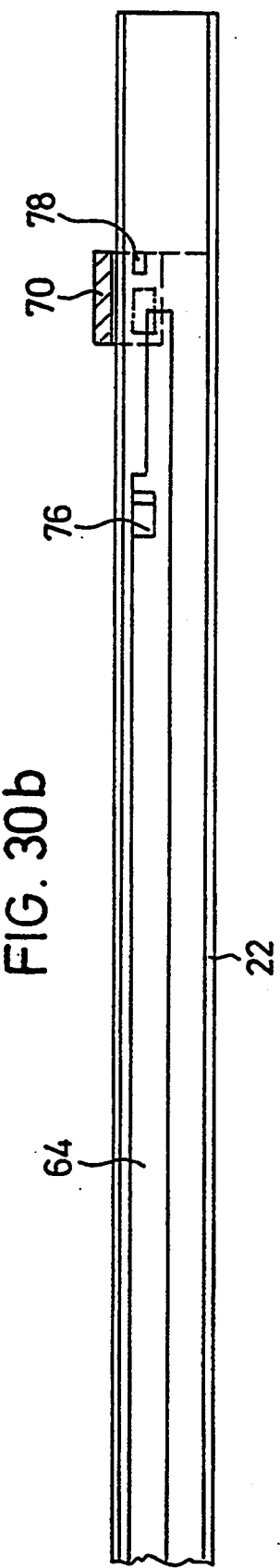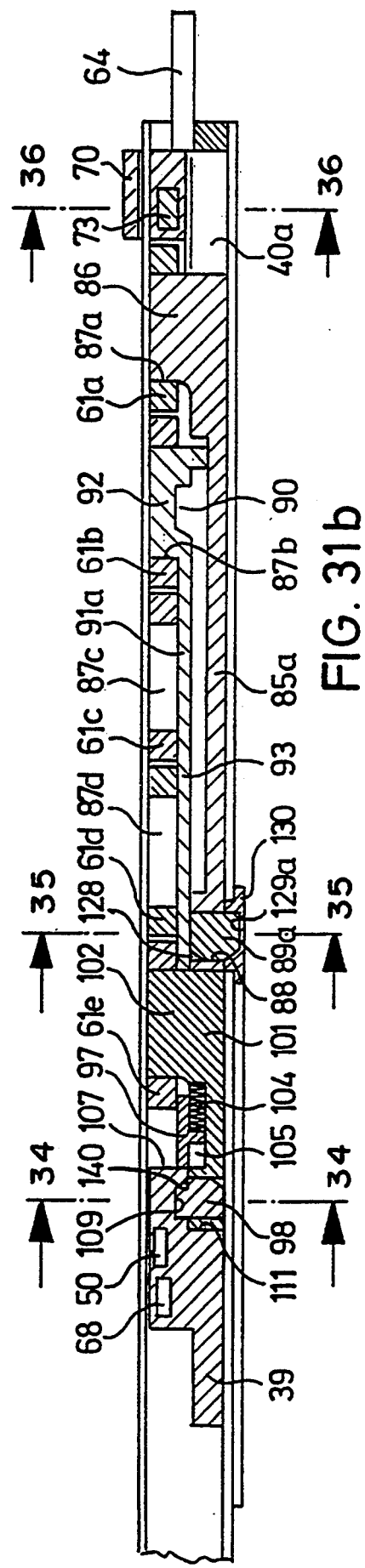

VEHICLE ROOF WITH A SERIES OF PLATES

BACKGROUND OF THE INVENTION

The invention relates to a louvre-like vehicle roof with a series of strip-like plates for optionally closing or at least partial opening of a roof opening in a stationary roof surface, wherein the plates adjoin one another in the closed position and form a flat composite assembly. More specifically, to such a vehicle roof where the plates are guided along guideways so that when shifting the plates, the flat composite assembly performs a translatory movement, in the course of which the plates are each individually separated and swiveled in an opening direction, when opening the roof, or in a closing direction when closing the roof.

In a known vehicle roof of this type (German utility model 1 811 690), during an opening displacement of the roof, the flat composite assembly performs a translatory movement, the front end of this assembly (in the direction of said movement) becoming separating plate by plate as the roof is opened, with each individual plate being pivoted about one of two guide locations. Each plate has two guide locations formed by journals which project laterally from respective guide cheeks mounted on the underside of each plate. The two journals are at different heights and engage spaced apart guideways in guide rails which are fixed to either side of the roof aperture. When the roof is opened, the journals which are in front in the direction of opening leave their associated guideways one after another while at the same time the relevant plate is, in a manner not disclosed in detail, caused to form a pivoting movement about the other journal which remains in its guide-way. In the case of the known vehicle roof, stability particularly leaves much to be desired if the roof is at least partially opened. The aforementioned roof type cannot be used with success for vehicle roofs which are curved transversely to the longitudinal axis of the vehicle. Also, the danger exists that, with the roof closed, rainwater or wash water will penetrate into the interior of the vehicle through the sealing seams between adjacent plates.

Another multiple plate vehicle roof is known from German application 3532150 C1). In opening the closed roof, the plates are, first, all pivoted together by a spindle drive into an upwardly extended position. The plates are then pushed rearwardly in unison. In this roof type, the flat composite assembly of plates is opened up at once as a whole when the roof is to be opened. This is aerodynamically unfavorable, even at relatively low travelling speeds, leading to disturbing wind noises.

In the case of yet another known vehicle roof (Great Britain Patent 573355), a series of strip-like plates are provided, each of which are associated with longitudinal guideways situated at different heights. The plates are guided along the guideways for displacement via parallelogram linkages. In order to open the closed roof the plates are moved to different heights with respect to one another and are then pushed together. There is no provision for any adjustment of the plates. Consequently, at least the part of the roof aperture corresponding to the width of one plates remains closed.

A louvre-like vehicle roof formed of strip-like plates is also known (U.K. Patent Appl. 2 113 623), in which the plates are first jointly swiveled upwardly to open the previously closed roof by a spindle mechanism, and then, are pushed together toward the rear, and in which the individual plates, in the area of their front edge carry a drip molding, which engages under the sealing gap to the respective plate lying in front of it. With this roof, the flat composite assembly as a whole is immediately broken when the roof is to be opened, which is aerodynamically disadvantageous. Disturbing wind noises can occur already at relatively low driving speed. Because of the installation of the drip moldings, the plates become heavier and wider.

SUMMARY OF THE INVENTION

The object of the invention is to provide a vehicle roof which has an aerodynamically advantageous behavior even at relatively high speeds.

It is a further object of the invention to attain the preceding object while, at the same time, the penetration of rainwater or wash water into the vehicle interior is effectively prevented.

These and other objects are achieved in accordance with preferred embodiments of the present invention which provides a vehicle roof comprising a fixed roof area defining an aperture, a pair of spaced guides that are rigidly joined with the roof, a series of movable strip-like plates for closing and at least partially opening the roof aperture, the plates abutting one another in sealing-tight manner and forming a flat composite assembly of plates when in the closed position, each plate being provided with respective guide means associated with each said guide, each said guide means providing guidance at a first and a second guide location which are spaced apart from each other in the direction of displacement, such that upon displacement of the plates the flat composite plate assembly performs a translatory movement (In the direction of movement), the front end of this assembly becoming disassembled plate by plate as the roof is opened, or restored when the roof is closed, each individual plate being pivoted at each guide means about at least the first of its two guide locations, wherein each said guide means at both of its guide locations is maintained in engagement with the guides over the entire range of adjustment of the plates.

Because the plates are at all times guided at two guide locations along each guide which is fixed in relation to the roof, even when the members are in the extended state, there is little in the way of unwanted movement due to air resistance. The members are, therefore, not so prone to bang and flap. The plates may be secured in any position in an accurate predetermined attitude in relation to one another and to the roof aperture. Preferably, the pivoting of each plate is about a pivot axis which extends transversely to the direction of displacement of the plates and the said pivoting takes place about respective sliding members mounted for displacement along the guides at the first of the two said guide locations. The said pivot axes of the plates are preferably offset away from the plate edge which leads during closing movement.

The pivot axes of the members are ideally offset, preferably towards the front of the plate. Thus, even in the case of a transversely curved vehicle roof, it is possible to avoid the plates colliding during pivoting.

Preferably, at the second guide locations the guide means of each plate co-operate with respective guideways, the movement of the guide means along at least a portion of their respective guideways causing the said pivoting of the plates about their pivot axes. The path of each said guideway is preferably such that when the plates are in their fully pivoted state, each plate is tilted and lies substantially parallel to the other.

The second guide locations of each plate are offset below the first guide locations and in the direction of closure. The said guide means at the second guide location preferably in each case provides a guide pin mounted on a guide member which is rigidly connected to the respective plate, the said guide member projecting obliquely downwardly from the associated plate in the direction of closure.

The vehicle roof, preferably, further includes driving means for moving the plates, the said driving means being coupled to all the plates when in the closed position. On opening the roof, the plates are uncoupled from the driving means one after another during the breaking up of the flat composite plate assembly, the plates being coupled up to the driving means one after another on closing the roof during the restoration of the composite plate assembly.

Preferably, a lifting member is provided for the leading plate in the direction of opening, the lifting member being capable of pivoting this plate while its pivot axis remains stationary in relation to the guides. This lifting member is preferably coupled to the driving means and guided for displacement along a respective guide, the displacement of the lifting member along the guide pivoting the leading plate from a closed position to a partially extended position in which the plate can be moved in relation to the guides.

When the roof is closed, the plates are preferably connected to one another at their engagement with said guides at said first guide location in a form-locking manner by longitudinally displaceable connecting rods and associated coupling means so that, upon opening the closed roof, the plates are disconnected from each other in turn, starting with the leading pair of plates in the opening direction. Upon closing of the opened roof, the plates are engaged with one another starting with the leading pair of plates in the closing direction.

Preferably, in order to disconnect the plates from their associated coupling means, and thereby their associated connecting rods, abutments are provided rigid with the roof, the disengagement of the coupling means from its associated plate being caused by the striking of the respective connecting rod with one of the said abutments.

When the roof is closed the sliding members are linked with one another in a form-locking manner through the connecting rods. The connecting rods are located in guide tracks for longitudinal displacement. On opening the closed roof, the form locking linkages become disengaged in turn, starting with the rearmost slide member which is pushed rearwards up against a stop at the end of the guide track. The next following slide member becomes disengaged when it is pushed up against the rearmost slide member. This process continues until all the slide members are pushed up one against the other.

When the roof is closed, the sliding member of the rearmost plate may be locked against movement in the guide track. This has the effect of locking all the other sliding members coupled to the rearmost slide member, when they reach their rearmost positions. Each of the sliding means may be provided with respective locking means which lock the sliding member in position to the guide track. In this way, all undesirable movement of the plates is prevented. The leading plate in the direction closure is separately coupled to the drive means at its engagement with said guides at said first locations.

When the roof is in the closed position, the plates are preferably locked in position in relation to the guides at their engagement with said guides at said first locations.

Preferably, the plates are each locked in relation to the guides when that plate has reached its respective fully extended position.

In the region of the front end the roof aperture, there may be a wind deflector which, in its inoperative position, lies adjacent to the flat composite plate assembly in its closed position. The wind deflector may be coupled to the drive means for displacement between its inoperative position and an extended operating position.

The coupling which link the adjustable roof components to the common drive may expediently be constructed as bolt block shift couplings which can also be used for locking the relevant roof components in specific position.

The common drive may comprise drive cables, preferably screw-threaded cables, which are connected in a drive transmitting manner to a drive unit. This drive unit may be an electric motor, generally with a reduction gearing on the downstream side. In principle, however, it is also possible to provide a hand crank drive.

To achieve the second object mentioned, according to the invention, at least one drip molding is hinged to a part of each of the plates, and these drip moldings are guided to slide along guideways so as to take part only in the translatory movements of the associated plate. In each position of the respective plate, each drip molding lies under the edge of a plate lying crosswise to the direction of displacement.

By this design, it is achieved that water, which has penetrated the sealing gap between adjacent plates or runs out from the plates swung out in opening the roof, is reliably collected without the plates, themselves, becoming heavier and wider. In the swung-out position, the section around which the plates project over the stationary roof surface and/or extend under the stationary roof surface is comparatively small. The plates can be pushed together in a problem-free manner when the roof is open. The drip moldings occupy a position in any roof position which they can reliably take up water. The drip moldings can be configured so that, despite a comparatively low overall structural height of the roof, splashing over or overflowing of the water present in the drip moldings is avoided in travel on rough roads and/or with heavy braking.

The drip moldings can be connected with the related plate on each side by a respective lever which, on the one hand, is hinged to the plate or its mounting and, on the other hand, to the drip molding. Alternatively, appropriate elastic elements can also be provided for the mutual connection of the plates and drip moldings.

A folding inside roof lining preferably is attached to the drip moldings, which is extended under the flat composite assembly and which is folded when opening the roof in the course of the combined sliding and swiveling movements of the individual plates. It is true, folding inside roof linings are known in vehicle roofs in various forms (compare, for example, German Offenlegungsschrift 40 39 583 A1). But in this case, as supports for the folding inside roof lining, no drip moldings are used which are coupled with the plates of a plate roof slaved in the direction of displacement. The inside roof lining faces the plates, the drip moldings and mechanical parts in each opening and closing position in the direction of the vehicle interior, and the inside roof lining acts as noise and heat insulation at the same time. The folding inside roof lining suitably is in flat connection with the underside of the drip moldings, for example, by its being glued flat with the drip molding undersides.

In another embodiment of the invention, at least one rod extending parallel to the drip moldings and connected with the inside roof lining is placed between each pair of successive drip moldings, and the rods can slide as a function of the opening and closing movements of the plates and impose additional folding on the inside roof lining. Since one or more such rods are provided in the area between each successive pair of drip moldings, the inside roof lining, there, is placed in two or suitably more folds. Consequently, the height of the individual folds is reduced, and the overall structural height of the system can be kept especially small.

The rods can suitably be guided in the same lengthwise guideways as the drip moldings, and these lengthwise guideways are, advantageously, integrally formed with the roof, just like the guideways for the plates.

The area of the roof opening in which the folds of the inside roof lining are formed is, preferably, faced from the bottom by a cover, so that, from the vehicle interior, only a smooth zone of the inside roof lining can be seen. The cover can be, in particular, part of a roof frame engaging under the roof opening and carrying or forming the guideways for the plates as well as the lengthwise guideways for the drip moldings. The arrangement, suitably, is made so that the folding inside roof lining disappears, at least for the most part, behind the cover when the roof is open and covers a frame opening bordered by the roof frame when the roof is closed.

These and further objects, features and advantages of the present invention will become apparent from the following description when taken in connection with the accompanying drawings which, for purposes of illustration only, show several embodiments in accordance with the present invention.

Brief Description of the Drawings

FIG. 4 is a longitudinal section through the vehicle roof in the open position, taken on the line 4—4 in FIG. 3;

FIG. 5 shown on an enlarged scale a partial longitudinal section taken on the line 5—5 in FIG. 3, in which the wind deflector is extended while the flat composite strip assembly is in the position corresponding to the closed position of the roof;

FIGS. 6a and 6b show in a juxtaposed relationship, an enlarged longitudinal section through the vehicle roof which is in the closed position, taken on the line 6—6 in FIG. 3;

FIG. 7 is a partial cross-section taken on the line 7—7 in FIG. 6a;

FIG. 8 is a partial cross-section taken on the line 8—8 in FIG. 6a;

FIGS. 10a and 10b show in a juxtaposed relationship a plan view of the coupling mechanism on one side of the roof when the roof is in the closed position;

FIGS. 11a and 11b are the same as 10a and 10b but with the roof in the fully open position;

FIGS. 12a and 12b show in a juxtaposed relationship side view of the arrangement shown in FIGS. 10a and 10b;

FIGS. 13a and 13b show in a juxtaposed relationship side view of the arrangement shown in FIGS. 11a and 11b;

FIG. 14 shows on an enlarged scale a perspective partial view of the coupling and drive mechanism;

FIGS. 15, 16, 17, 18 and 19 are sections taken on the lines 15—15, 16—16, 17—17, 18—18 and 19—19 respectively of FIG. 12a.

FIGS. 24a and 24b, together, form a lengthwise section through the closed plate roof along line 24—24 of FIG. 3, in which the parts of the movement mechanism represented in FIG. 21 have been left out for the sake of clarity;

FIG. 25 is a partial lengthwise section corresponding to FIG. 24b with the roof fully open;

FIG. 26 is a partial lengthwise section along line 21—21 of FIG. 3, but which shows the folding inside roof lining when the roof is fully open;

FIGS. 30a and 30b show in juxtaposed relationship a vertical sectional view of the arrangement shown in FIGS. 28a and 28b along line 30a—30a of FIGS. 10a and 28a and line 30b—30b of FIGS. 10b and 28b, respectively;

FIGS. 31a and 31b show in juxtaposed relationship a vertical sectional view of the arrangement shown in FIGS. 29a and 29b along line 31a—31a of FIGS. 11a and 29a and line 31b—31b of FIGS. 11b and 29b, respectively;

FIGS. 32 and 33 are sections taken on the lines 32—32 and 33—33, respectively, of FIGS. 11a and 29a.

DETAILED DESCRIPTION OF THE PREFERRED EMBODIMENTS

Figure 1:
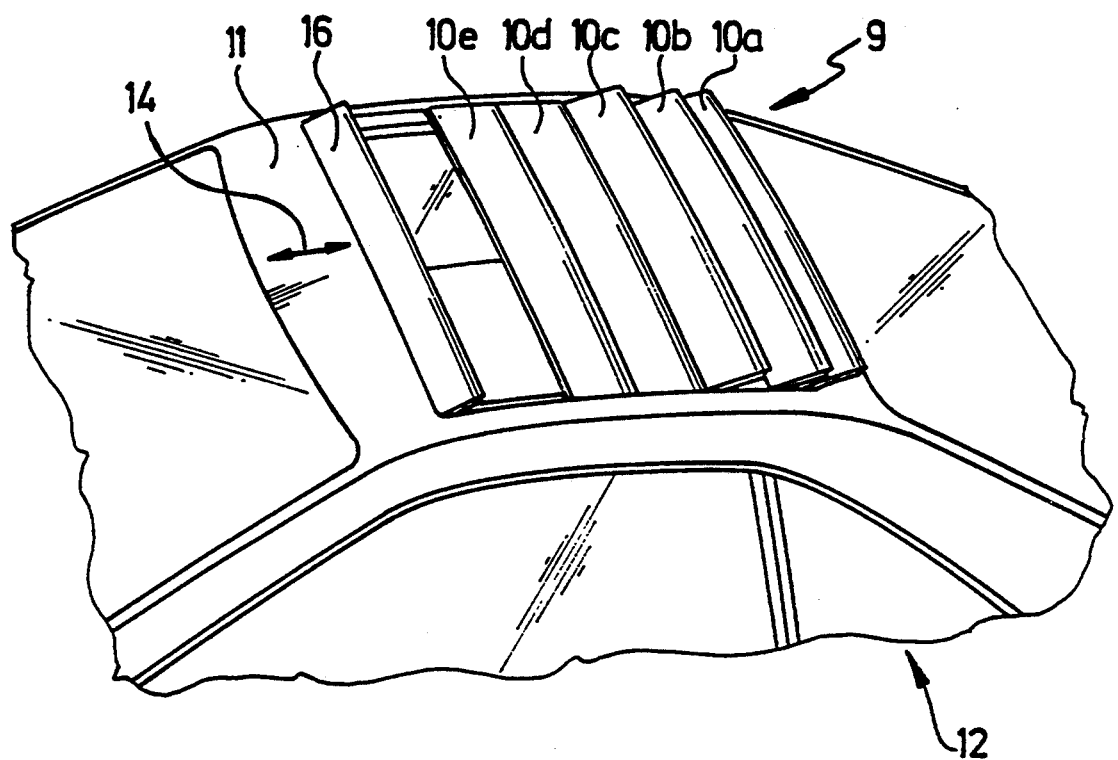
FIG. 1 is a diagrammatic view, in perspective, of a plate roof in a partially open position.
Figure 2:
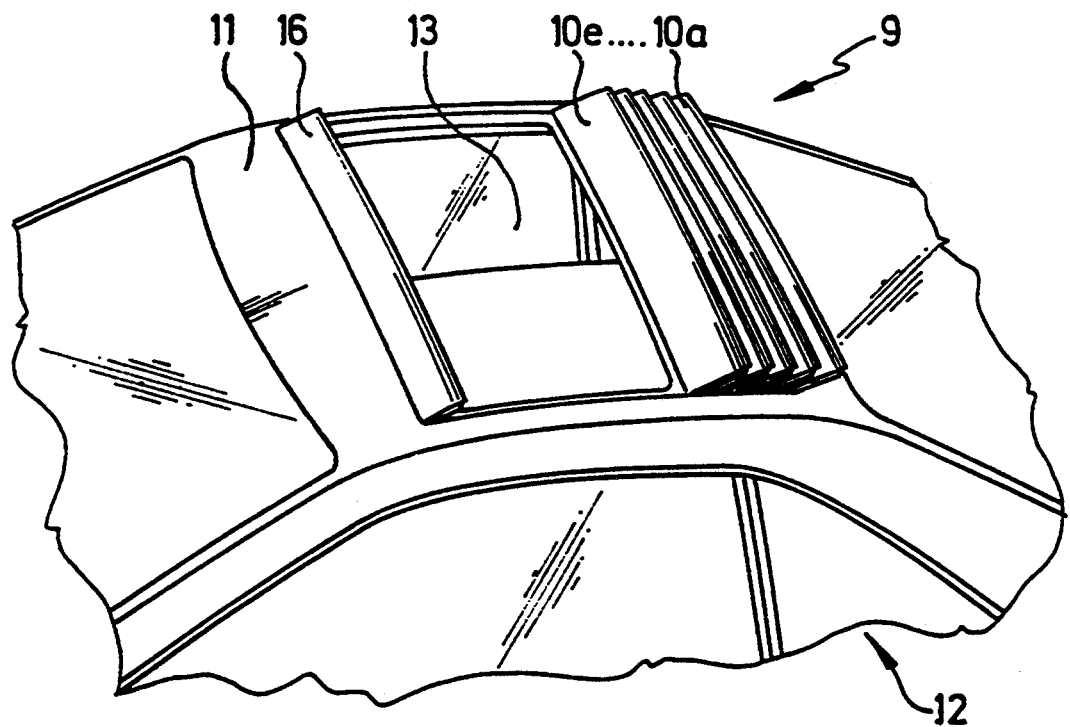
FIG. 2 is a view corresponding to FIG. 1 with the roof fully open.

The vehicle roof 9, explained here, and referred to as a louvre-like plate roof, exhibits, as can be seen from the diagrammatic representations of FIG. 1 and 2, a series of strip-like sliding plates 10a to 10e. These plates are used for the selective closing and at least partial opening of a roof opening 13, which is made in a stationary roof surface 11 of a motor vehicle 12. To open and close roof 9, plates 10a to 10e can be moved, in the embodiment shown, in the direction of displacement indicated by a double arrow 14 which runs parallel to the longitudinal axis of the vehicle. But, basically, other directions of displacement, e.g., crosswise to the longitudinal axis of the vehicle, are also possible. In their closed position, plates 10a to 10e adjoin one another in a sealing manner with their longitudinal edges running crosswise to displacement directions of arrow 14. In this case, they form a flat composite assembly, as this is indicated in FIG. 1 for plates 10d and 10e. Plates 10a to 10e also can be swiveled around a respective swivel axis 15a to 15e (FIG. 3) extending crosswise to directions of displacement of arrow 14. FIGS. 1 and 2 show a vehicle roof with five sliding plates 10a to 103. It will however be understood that the number of sliding plates can in principle be selected according to circumstances.

An adjusting mechanism, to be explained in greater detail hereinafter, co-ordinates the sliding displacement and pivoting movements of the individual plates 10a to 10e so that upon opening the roof 9 the sliding plates of the flat composite plate assembly perform a translatory movement in the directions of displacement of arrow 14. The plates 10a to 10e pivot in turn, starting with the rearmost plate 10a, and then slide rearwards so that in the fully open position the plates 10a to 10e lie one on top of the other. The composite assembly is therefore opened up plate by plate. Closing the roof 9 is performed by the reverse sequence of movements so that the composite assembly is restored plate by plate. In opening the closed roof 9, plate 10a is first separated from the flat composite plate assembly by the pivoting of this plate about its pivot axis 15a. The rear edge of the plate comes away from the rear edge of the roof opening 13. Then, starting in this oblique attitude, the plate 10a is displaced rearwardly together with the other plates 10b to 10e which remain in the flat composite assembly, i.e. which are not outwardly pivoted. When this happens, the plate 10a is further pivoted continuously into its position of maximum displacement. Once the plate 10a has reached this maximum position shown in FIGS. 1 and 2, the next plate 10b is pivoted about its axis 15b and then moved rearwards. This process is repeated until, as shown in FIG. 2, all the sliding plates 10a to 10e have been pivoted out and then moved rearwards into their maximum opening positions.

In closing the opened roof, plate 10e is moved forwards and pivoted back into a position flush with the fixed roof surface 11. A corresponding pattern of movements is then repeated for the subsequent plates 10d to 10a, one after another, until all the plates are in their extreme forward positions and the flat composite plate assembly recloses the roof opening 13.

An extensible strip-like wind deflector 16 is provided in the region of the leading edge of the roof opening 13. When the opening process is initiated, the wind deflector 16 is pivoted about a virtual pivot axis 33 (FIG. 5) extending transversely to the longitudinal axis of the vehicle. The deflector 16 pivots so that its rear edge is raised above the level of the fixed roof. With the wind deflector 16 in this position, the roof assumes a ventilation position which can be used with the plates 10a to 10e in the closed position when it is raining. When the roof 9 is in the closed position, the rear edge of the wind deflector 16 can be closed up against the leading edge of the sliding plate 10e in a sealing-tight manner. In doing so, it closes the frontmost part of the roof opening 13. If necessary, the design can be such that the deflector 16 can be provided in a aperture that is separate from the main roof aperture or can be dispensed with altogether. The flat composite assembly of plates 10a to 10e will then extend from the leading edge to the rear edge of the roof opening 13 when in the closed position, and thus, takes over the entire closing function by itself. The wind deflector may be concealed under the fixed roof area when the roof is closed, and then automatically move into an operative position when the roof is opened. Such deflectors are known in the case of sliding roofs as set out in German Offenlegungsschrift 3426998 as well as U.S. Pat. Nos. 5,052,746 and 3,904,239.

Figure 3:
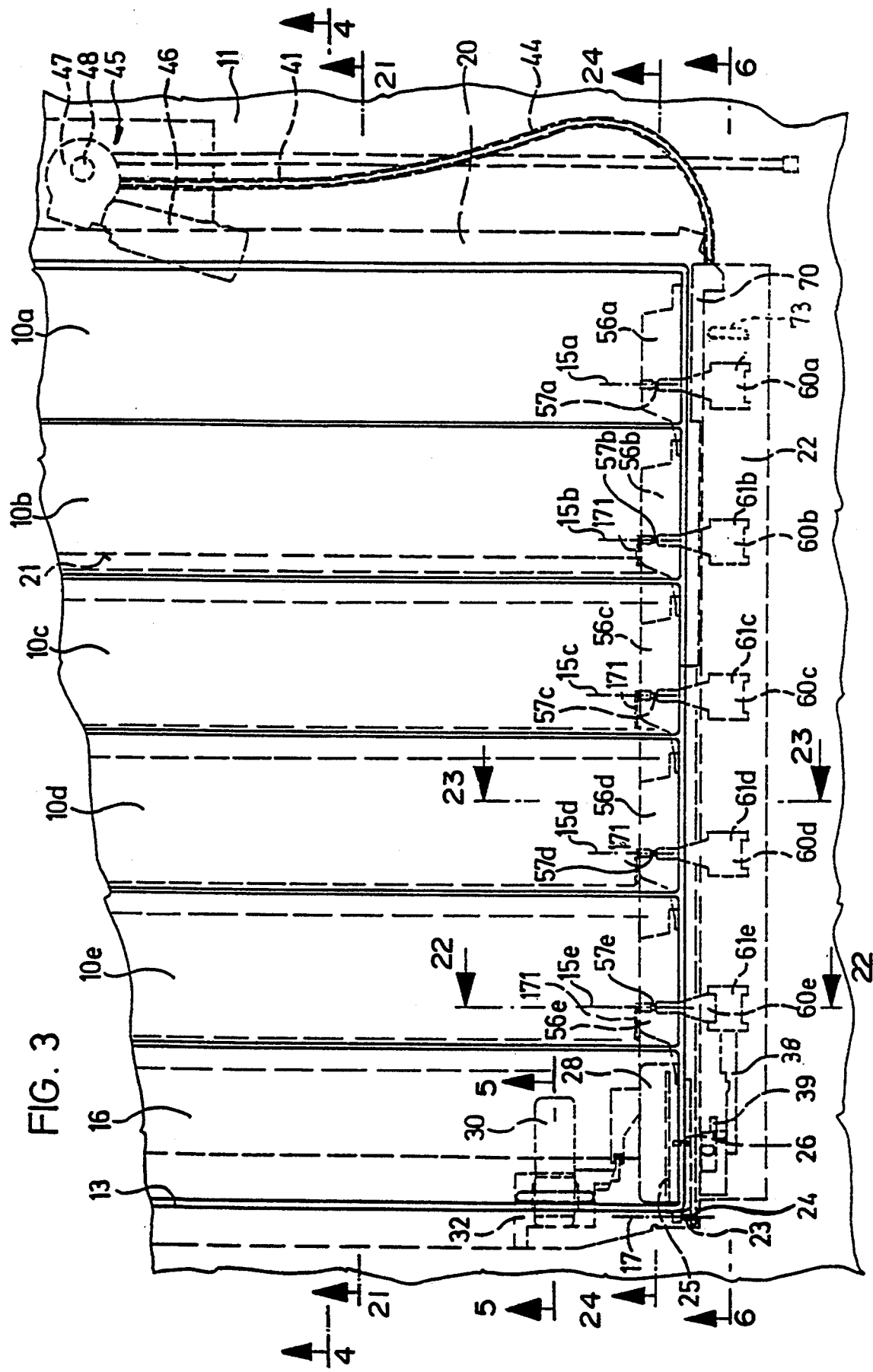
FIG. 3 is a top view of one side of the vehicle roof in the fully closed position.
Figure 7:
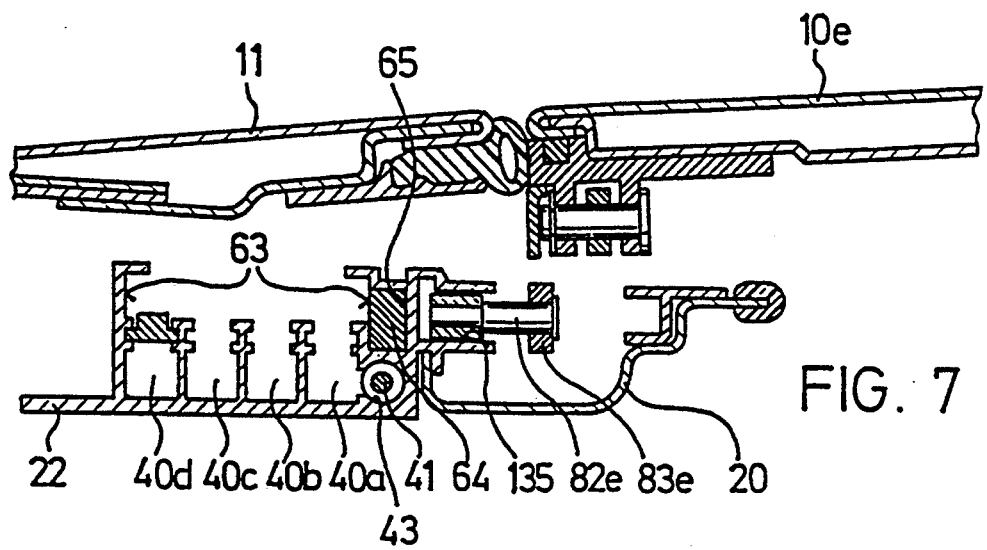

Referring now to FIGS. 3 to 5, the vehicle roof 9 comprises a roof frame 20 mounted under the fixed roof surface 11. The frame 20 extends around the roof opening 13 and defines a frame aperture 21. On each side of the roof frame 20, extending parallel to the longitudinal movement directions of arrow 14, is a guide rail 22. The guide rail 22 is supported rigidly in relation to the roof. On both sides of the roof 9, the construction of the roof 9 is symmetrical about the longitudinal center plane of the roof so that only a description of one side of the roof is needed.

At the front end of the guide rail 22 is a pivot bearing 23 which accommodates a bearing pin 24 (FIGS. 3 and 6a). The bearing pin 24 is mounted at the front end of a carrier 25 for the wind deflector 16. The pivot bearing 23 of the guide rail 22 determines the pivot axis 17 of the carrier 25. The wind deflector carrier 25 also has a link pin 26 which is located in the mid-region of the carrier 25 and which projects laterally outward. The link pin 26 engages in a track 27 (FIGS. 6a, 15 and 16) provided in an push-out guide 28 running in the guide rail 22. The underside of the leading edge of the wind deflector 16, has a bearing tongue 30 (FIG. 5), which engages for sliding movement in an curved receptacle 31 of a pivot bearing block 32 mounted on the roof frame 20. This arrangement forms the virtual pivot axis 33 of the wind deflector 16.

Figure 15:
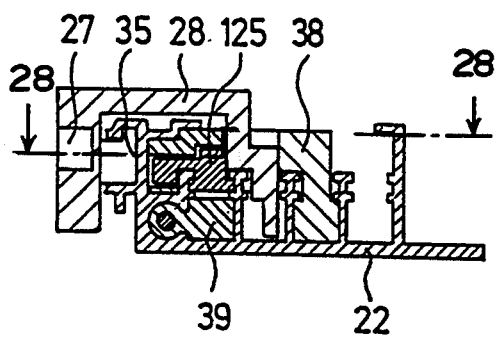
Figure 16:
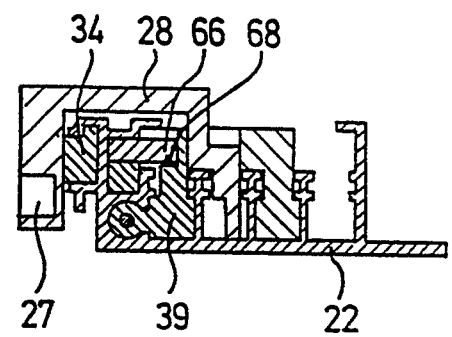

The push-out guide 28 is guided for longitudinal displacement along a limited path on the guide rail 22. For this purpose, sliding members 34 engage a guideway 35 in the guide rail 22 (FIGS. 15 and 16). The frontmost extreme position of the push-out guide 28 is shown in FIGS. 10a, 12a, 15-17, 28a and 30a; the rearmost extreme position of the push-out guide 28 is shown in FIGS. 11a, 13a, 29a, 31a, and 32. In the closed position of the roof 9, a locking member 36 links the push-out guide 28 to a coupling member 39. An abutment member 38 mounted on the guide rail 22 has a guide surface 37 which keeps the locking member 36 in position so that the coupling member 39 can transmit a driving force to the push-out guide 28. The locking member 36 can be displaced transversely to the longitudinal axis of the guide rail 22 so that the push-out guide 28 and the coupling member are disengaged (FIGS. 10a, 11a, 17, 28a, and 32).

The coupling member 39 is guided for displacement along one (40a) of four adjacently disposed bottom guideways 40a to 40d of the guide rail 22 and is rigidly connected to a drive cable 41. The drive cable 41 which is preferably a screw-threaded cable which extends through a cable guide channel 43 in the guide rail 22 and through a guide tube 44 (FIG. 3) adjacent the rear portion of the roof frame 20 to a drive unit 45. The drive unit 45 comprises an electric motor 46 and a reduction gear mechanism 47. A pinion 48 connected to the output from the reduction gear mechanism 47 engages the drive cable 41 and a corresponding drive cable for the other side of the roof (FIG. 4).

Figure 17:
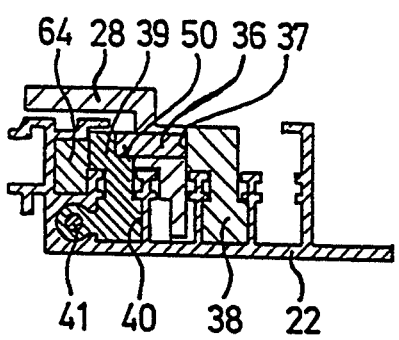
Figure 28A:
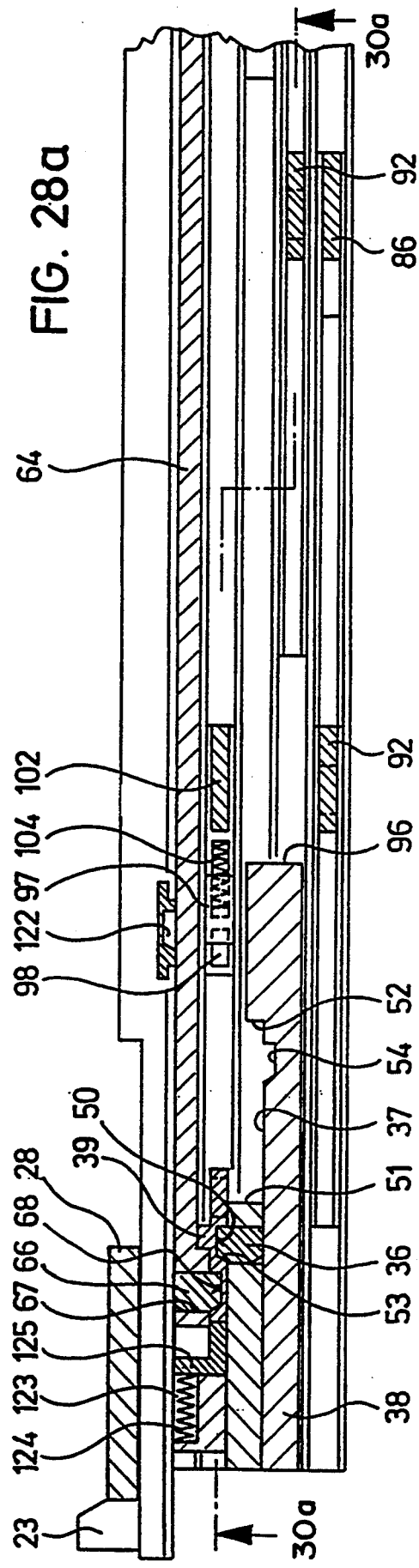
FIGS. 28a and 28b show in juxtaposed relationship a horizontal sectional view of the coupling mechanism on one side of the roof along line 28—28 of FIG. 15, when the roof is in the closed position.
Figure 29A:
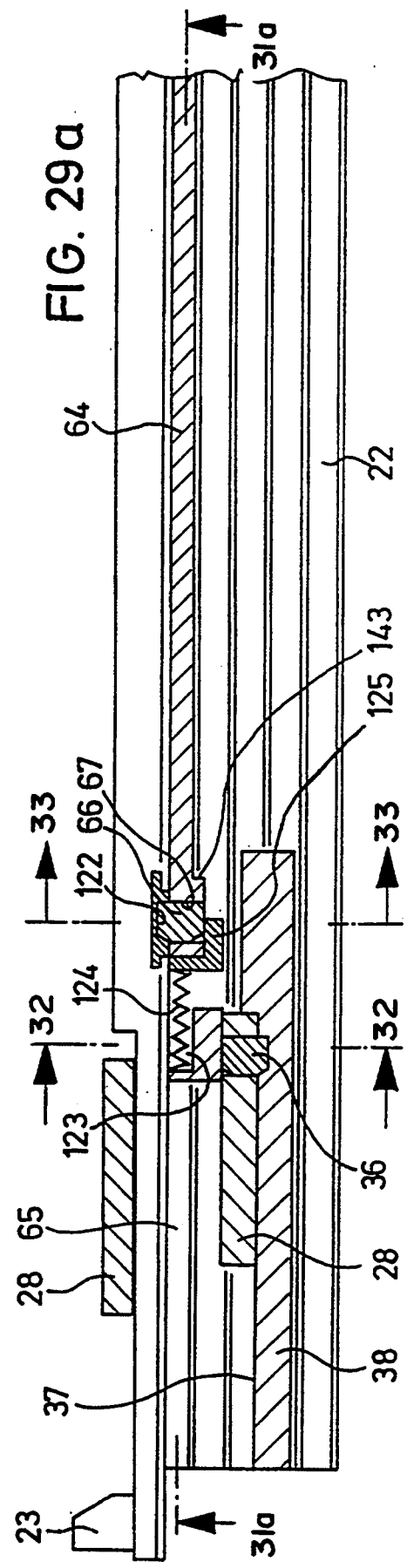
FIGS. 29a and 29b are the same as FIG. 28a and 28b but with the roof in the fully open position; being taken along line 29—29 of FIG. 32.

When the drive cable 41 is displaced rearwards from the position shown in FIGS. 10a, 12a, 28a and 30a, then the push-out guide 28 is moved rearwards until its end face 51 abuts a surface 52 on the abutment member 38. The push-out guide 28 is entrained by the coupling member 39 through the locking member 36 which engages a locking member recess 50 of the coupling member 39 (FIGS. 17 and 28a). As the end face 51 approaches surface 52, an oblique surface 53 of the locking member recess 50 displaces the locking member 36 into a recess 54 in abutment member 38. This disengages the drive connection between the coupling member 39 and the push-out guide 28. The push-out guide 28 then becomes fixed in relation to the abutment member 38 and thus also in relation to the guide rail 22 (FIG. 29a). During the displacement movement of the push-out guide 28 from the position shown in FIGS. 10a, 12a, 28a and 30a into the position shown in FIGS. 11a, 29a and 31a 13a, the link pin 26 runs upwardly along the track 27. In doing so the wind deflector strip 15 is caused to perform an upward pivoting movement about the virtual pivot axis 33. The wind deflector 16 goes from the closed position shown in FIGS. 3 and 6a to the extended position shown in FIGS. 4 and 5.

The sliding plates 10a to 10e are fixed on both sides of the roof opening 13, on respective plate carriers 56a to 56e (FIGS. 6a and 6b). Seated on each of the plate carriers 56a to 56e and orientated transversely to the directions of displacement of arrow 14 is a pivot axes 15a to 15e about which the respective plates 10a to 10e are pivoted when the roof 9 is opened and closed. Each of the pivot axes 15a to 15e (FIG. 3), each of which passes through a respective one of the pivot bearing pins 57a–57e, is set back by a distance A (FIG. 6b) from the leading edge 58 of the relevant plate. The pivot bearing pins 57a to 57e engage a respective bearing aperture 59 (FIGS. 8 and 14) at the inner end of a respective one of the sliding members 60a to 60e. The sliding members 60a to 60e associated with the respective plate 10a to 10e are guided for displacement along the guide rail 22. For this purpose, the sliding members 60a to 60e are provided with a sliding bearing 61a to 61e at their outer end which is remote from the bearing aperture 59 (see FIGS. 8 and 14). The sliding bearings carry sliding shoes 62 which engage two spaced apart mutually opposite upper guide grooves 63 in the guide rail 22.

A drive rod 64 is guided for longitudinal displacement in a guide passage 65 of the guide rail 22 which is above the cable guide channel 43. Linking the drive rod 64 to the coupling member 39 is a bolt member 66 mounted in a recess 67 in the drive rod 64. The bolt member 66 is adapted to be seated in a recess 68 in the coupling member 39. When the roof 9 is opened from the closed position the bolt member 66 engages with both the drive rod 64 and the coupling member 39 (FIG. 28a). When the coupling member 39 moves rearwardly it takes the drive rod 64 with it due to its entrainment through the bolt member 66.

Close to the rear end of the guide rail 22 is a lifting lever 70 associated with the plate 10a and mounted for displacement along the guide rail 22 by a limited distance (FIGS. 10b to 13b, 20, 28b, 29b, 30b and 31b). The lifting lever 70 has a transverse web 71 which is guided in the upper guide groove in the guide rail 22. Mounted in a recess 72 in the transverse web 71 and transverse to the direction of displacement of arrow 14 of the lifting lever 70 is a bolt member 73. A bolt member housing 75 (FIGS. 10b, 11b, and 28b and 29b) is provided and this is mounted to the side of the guide rail 22. The bolt member housing 75 has a recess 74 for accommodating part of the bolt member 73.

Figure 20:
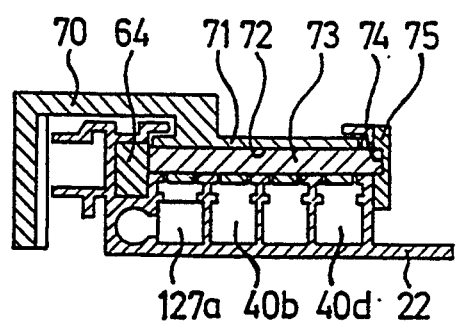
FIG. 20 is a cross-section taken on the line 20—20 in FIG. 12b.
Figure 28B:
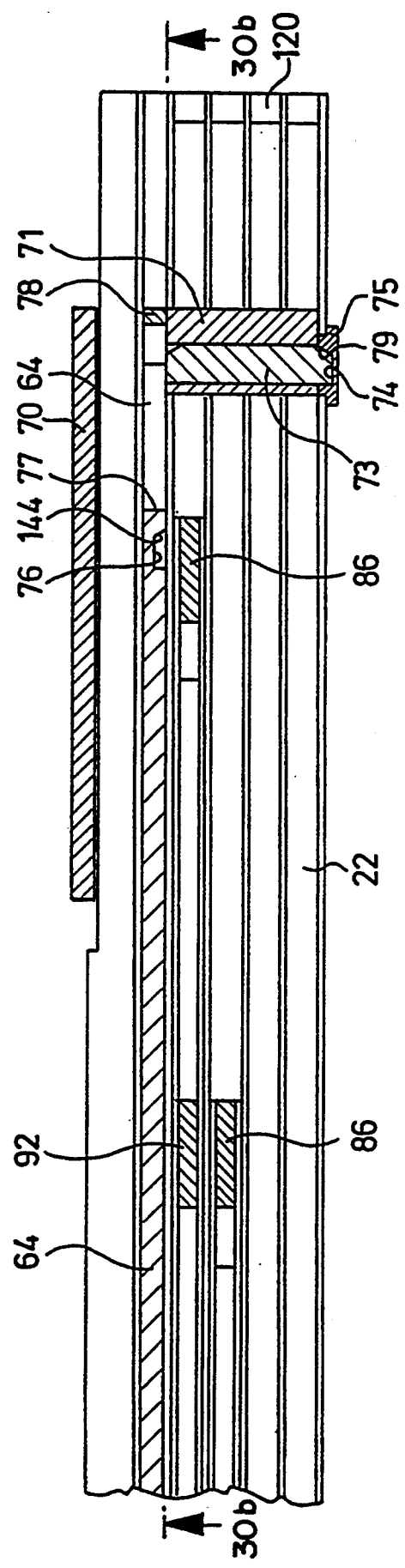
Figure 29B:
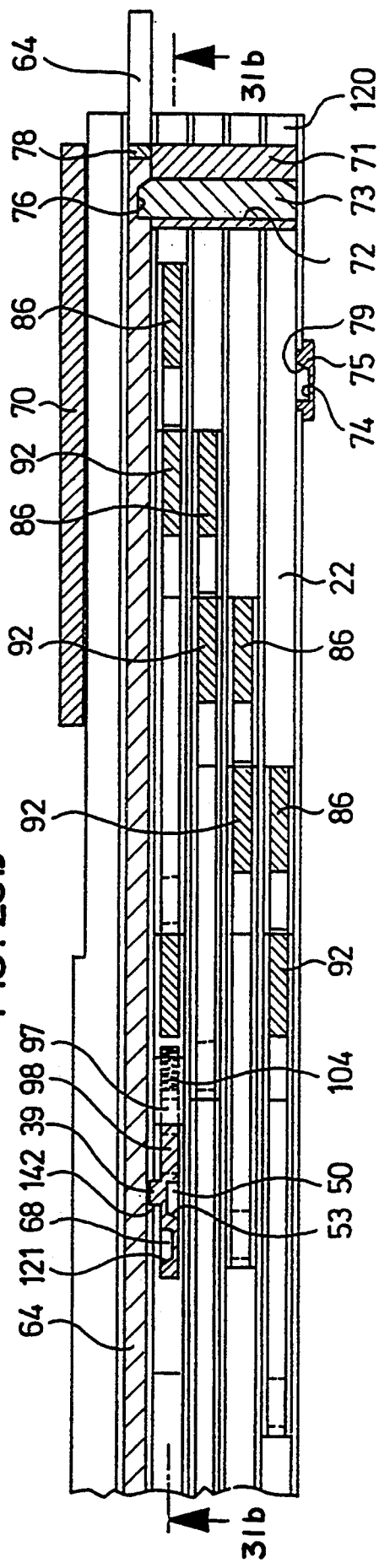
Figure 30A:
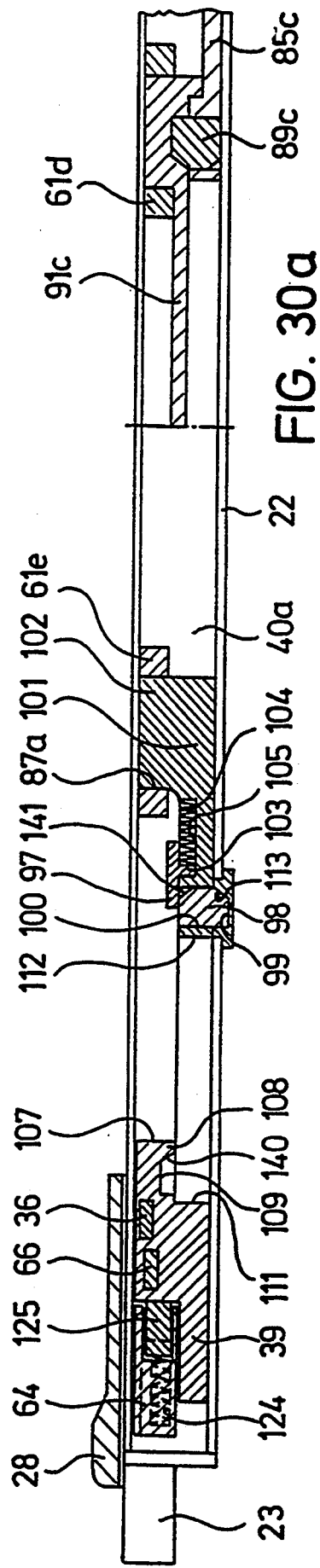
Figure 31A:
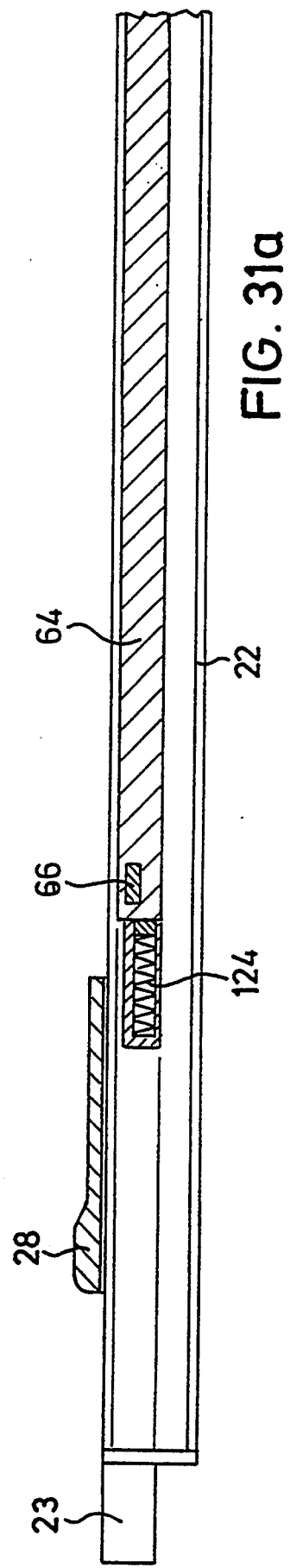
Figure 32:
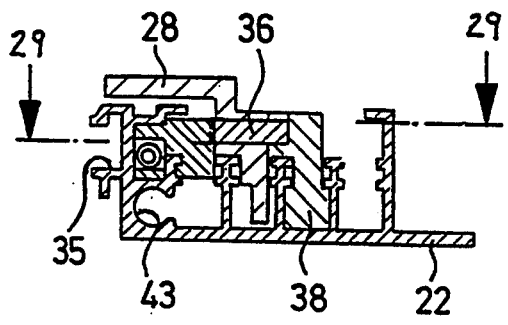
Figure 33:
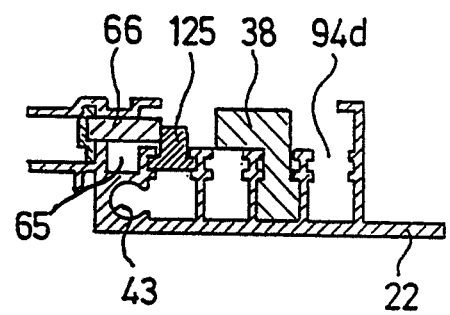
Figure 34:
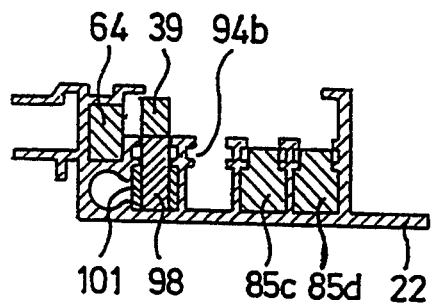
FIGS. 34, 35 and 36 are sections taken on lines 34—34, 35—35 and 36—36, respectively, of FIGS. 13b and 31b.
Figure 35:
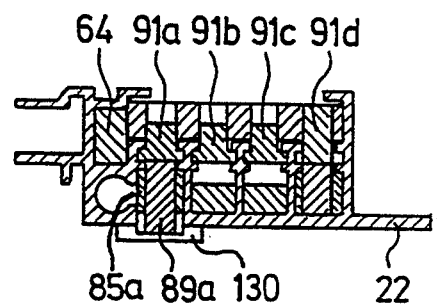
Figure 36:
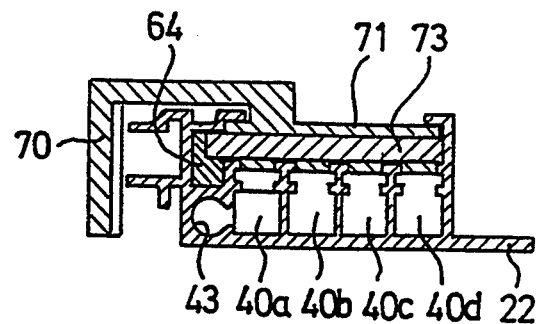

In the closed position, the bolt member 73 is seated in the recess 74 by virtue of the drive rod 64 acting against the other side of the bolt member 73 (FIG. 28b). The lifting lever 70 and the plate 10a are therefore locked in the closed position (FIGS. 10b and 20). Close to its rear end, the drive rod 64 has a recess 76. Also the drive rod 64 has a step 77 therein which is in line with a projection 78 protruding from the lifting lever 70 (FIGS. 28b and 29b).

As the roof is opened, the drive rod 64 is moved rearwardly by the coupling member 39. As the recess 76 in the drive rod 64 approaches a position of alignment with the recess 74 in the bolt member housing 75, the step 77 on the drive rod 64 strikes the projection 78 on the lifting lever 70. The lifting lever 70 becomes entrained rearwardly by the drive rod 64. While this is happening, an oblique surface 79 on the recess 74 exerts a force on the bolt member 73 out of the recess 74 and thus out of engagement with the bolt member housing 75. The end of the bolt member 73 which is remote from the bolt member housing 75 fits into the recess 76 in the drive rod 64. Thus, it couples the lifting lever 70 to the drive rod 64 (FIGS. 11b, 13b and 29b). The lifting lever 70 has a downwardly and forwardly inclined slideway 81 (FIG. 6b) which is open at its lower front end. Cooperating with the slideway 81 is a guide pin 82a which projects from the side of a guide member 83a of the plate carrier 56a. This guide member is directed obliquely forwardly and downwardly from the front end of the plate carrier 56a. In the closed roof position, it extends as far as a position under the plate carriers 56b of the next plate 10b.

As a result of the rearward displacement of the lifting lever 70, the guide pin 82a which engages the slideway 81 is forced downwardly. The plate carrier 56a is caused to pivot about the pivot bearing pin 57a in FIG. 6b in an anticlockwise toward the swung-out position shown in FIG. 21. Thus, the rear end of the plate 10a mounted on the plate carrier 56a is lifted above the level of the fixed roof surface 11 adjacent the rear of the roof opening 13. During the course of this opening out movement, the plate 10a moves away from the rear edge of the roof opening 13. The plate 10a can then be displaced rearwardly, the extending pivoting movement of the plate 10a continuing, without any collision between the plate and the fixed roof surface as it moves into the FIG. 21 position.

The sliding bearings 61a to 61e, and thus also the sliding members 60a to 60e, are separately connected to one another by connecting rods 85a to 85d (FIGS. 10a, 10b, and 31b) which are guided for displacement in the bottom guideways 40a to 40d of the guide rail 22. As can be seen particularly in FIG. 14, each of the connecting rods 85a to 85d has a raised journal 86 close to its rear end. Each of the sliding bearings 61a to 61e is provided with four recesses 87a to 87d. The journal 86 of the connecting rod 85a fits into the recess 87a of the sliding bearing 61a, the journal 86 of the connecting rod 85b fits into the recess 87b of the sliding bearing 61b, the journal 86 on the connecting rod 85c engages the recess 87c of the sliding bearing 61c and the journal 86 on the connecting rod 85d fits into the recess 87d of the sliding bearing 61d.

Figure 8:
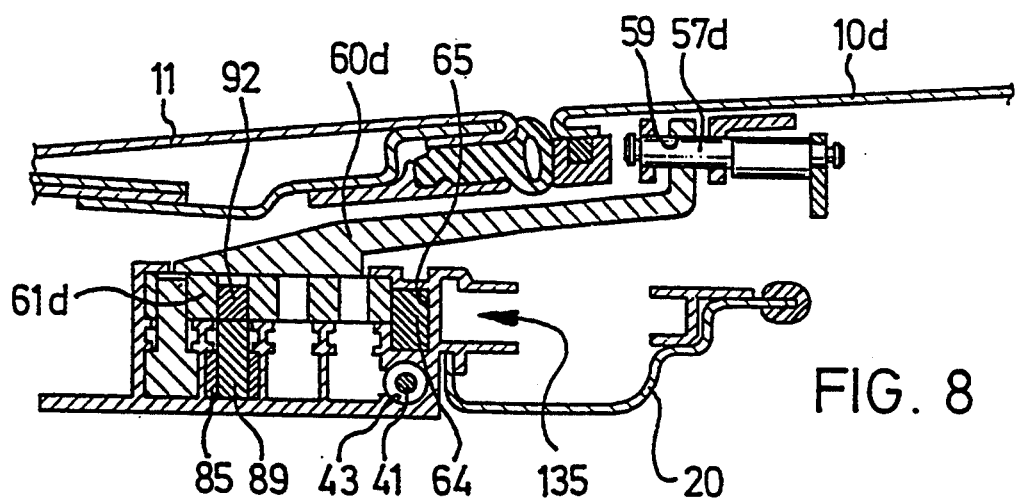
Figure 19:
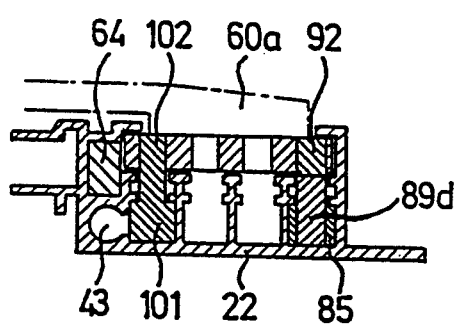

In the region of the front end of each of the connecting rods 85a to 85d there is a respective channel 88, in which a respective bolt engaging member 89a to 89d is guided for vertical displacement. The bolt engaging members 89a to 89d, are seated in respective channels 88 and are supported by the base of the associated underlying guide groove 40a to 40d (FIGS. 8, 19, and 31b). The bolt members 89a to 89d protrude and the protruding portions fit into respective recesses 90 of bolt engaging members 91a to 91d. Each of the bolt engaging members 91a to 91d has an upwardly projecting journal 92 just rearward of the recess 90. This journal 92 fits up into a respective one of the recesses 87a to 87d of the next forwardly disposed sliding bearing 61a to 61e. As long as the bolt members 89a to 89d protrude from their channels, then the connecting rods 85a to 85d are coupled to their respective bolt engaging members 91a to 91d. Therefore, the sliding bearings 61a to 61e are connected to one another in a form-locking fashion.

The bolt engaging members 91a to 91d each have a tongue 93 projecting forwardly from the journal 92. These tongues 93 are guided for displacement in a longitudinal direction in a respective one of four middle guideways 94a to 94d in the guide rail 22. The guideways 94a to 94d are in each case above a respective one of the lower guideways 40a to 40d and they are in open communication with them.

Figure 18:
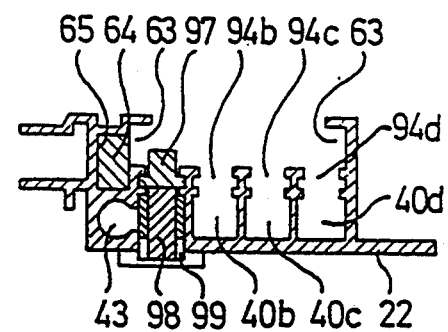

When the roof 9 is in the closed position, the sliding bearing 61e of the leading plate 10e bears on the rearwardly directed end face 96 of the abutment member 38 which is fixed to the guide rail 22 (FIG. 10a). In this position, a sliding member 97 (FIGS. 12a, 18 and 30a) running in guideway 94a presses a bolt member 98 down into a recess 99 in the guide rail 22. The bolt member 98 is mounted for displacement in a vertical direction in a vertically arranged aperture 100 at the front end of a connecting rod 101. The connecting rod 101 is guided for longitudinal displacement in the lower guideway 40a of the guide rail 22. It has an upwardly projecting journal 102 which from below engages the recess 87a in the frontmost sliding bearing 61e. By engagement of the bolt member 98 into the recess 99 in the guide rail 22, the flat composite plate assembly is locked in the closed position via the connecting rod 101 and the connecting rods 85a to 85d through the bolt members 89a to 89d. The sliding member 97 has a downwardly projecting nose 103 and there is a spring 104 (FIGS. 12a and 30a) housed in a recess 105 in connecting rod 101 which presses against the nose 103 so as to keep the sliding member 97 in position above the bolt member 98. The bolt member 98 is therefore prevented from moving out of recess 99.

During opening of the roof 9 as soon as the rearmost plate 10a has its rear edge lifting above the fixed roof surface 11, the end face 107 of the coupling member 39 encounters the sliding member 97. This is then pushed rearwardly against the force of the spring 104. The bolt member 98 is, initially, kept in the recess 99 by the nose 108 of the coupling member 39; but, in the course of the further rearward movement of the coupling member 39, a downwardly opening recess 109 of coupling member 39 aligns with the recess 99. An abutment face 111 on the coupling member 39 bears against surface 112 on the front end of the connecting rod 101. Rearwardly directed pressure is transmitted from the coupling member 39 to the connecting rod 101 and thence to the bolt member 98. The bolt member 98 is caused to lift out of the recess 99 by virtue of an inclined surface 113 on the recess 99 and a correspondingly inclined surface on the bolt member 98. The interlocking between the guide rail 22 and the connecting rod 101 and consequently the sliding bearings 61a to 61e is broken. Further rearward movement of the coupling member 39 pushes the connecting rod 101 rearwards as well, surface 111 of the coupling member 39 pressing against surface 112 of connecting rod 101 (FIG. 31b). This displacement movement is also transmitted via the connecting rods 85a to 85d to the sliding members 60a to 60d. In this way, displacement of the entire composite plate assembly commences once the rear end of the rearmost plate 10a has been lifted over the fixed roof surface 11 in the manner previously explained.

Figure 9:
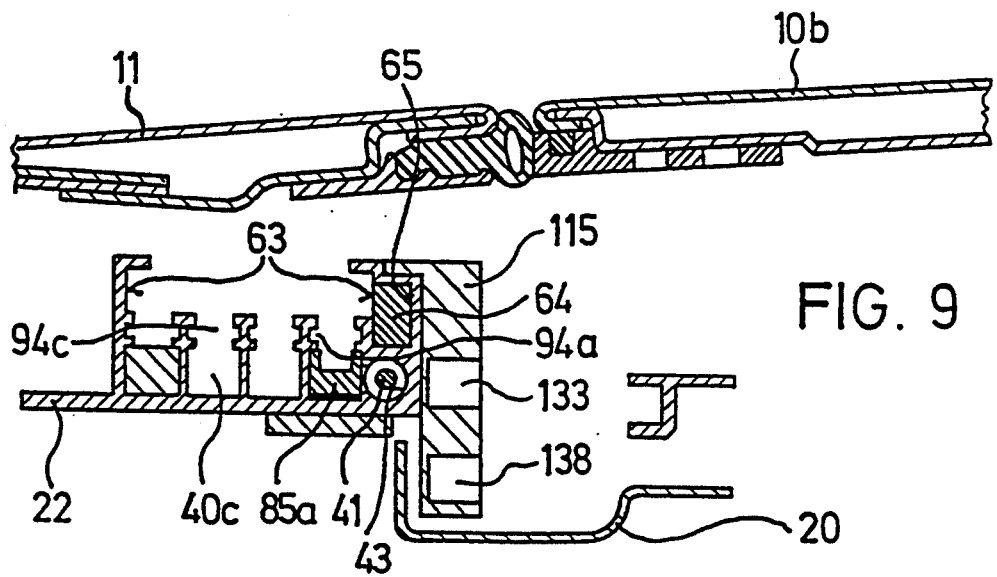
FIG. 9 is a partial cross-section taken on the line 9—9 in FIG. 6b.

A push-out guide member 115 (FIGS. 6b and 9) is fixed to the rear part of the guide rail 22. The push-out guide member 115 has an obliquely rearwardly and downwardly directed guide slot 116 which is engaged by the guide pin 82a. The guide slot 116 is provided with a fairly steep front portion 117 and a less steeply inclined rear portion 118. During the initial pivoting movement of the sliding plate 10a from its fully closed position, the guide pin 82a will move downwardly in the front portion 117. Thereafter, when the composite plate assembly is displaced rearwardly, the guide pin 82a will move further rearwardly and downwardly in the portion 118. Thus, the plate 10a, in FIG. 6b, is pivoted further in a counterclockwise direction, while the plate 10a is displaced rearwardly. The lifting lever 70 is also entrained rearwardly with the movement of the coupling member 39 via bolt member 66 and the abutting step 77. The lifting lever 70 is moved rearwards until it comes into engagement with an abutment 120 which is mounted rigidly on the guide rail 22 (FIGS. 11b and 29b). At this point, the bolt member 66 is pressed transversely inwardly by a sloping surface 121 on the coupling member 39. When this happens, the bolt member 66 engages in a recess 122 in the guide rail 22. Consequently, the drive rod 64 is uncoupled from the coupling member 39 and thus from the drive unit 45. The drive rod 64 becomes locked in relation to the guide rail 22 (FIG. 29a). Seated in an aperture 123 in the drive rod 64 is a spring 124 (FIGS. 11a, 28a and 29a) which presses against a locking sliding member 125 in a rearward direction. The locking sliding member 125 is guided for displacement in the guide rail 22. As soon as the bolt member 98 is engaged in recess 122, the locking sliding member 125 is applied to the side of the bolt member 66 remote from the recess 122, under the action of the tensioned spring 124, the locking sliding member 125 keeps the bolt member 66 engaged within the recess 122 and so locks the driving rod 64 to the guide rail 22. The coupling member 39 can then be displaced further rearwards (FIGS. 11b and 29a).

Seated in each of the lower guideways 40a to 40d of the guide rail 22 are abutments 127a to 127d (FIG. 11b). The abutments 127a and 127d determine the maximum rearward position of respective connecting rods 85a to 85d. When the composite plate assembly is pushed backwards by the coupling member 39, the first connecting rod 85a strikes the fixed abutment 127a in the guideway 40a. By continued action of the driving force on the composite plate assembly, the bolt engaging member 91a encounters an oblique surface 128 on the bolt member 89a and exerts a downwardly directed force component. As a result, the bolt member 89a is displaced in a vertical direction relative to the connecting rod 85a. It moves clear from the recess 90 of the bolt engaging member 91a and instead its lower end is pressed into the rearmost 129a of four recesses 129a to 129d of an arresting means 130 which is fixed to the guide rail 22 (FIGS. 12b, 13b, and 31b). Thus, the drive connection between the rearmost sliding bearing 61a and the sliding bearing 61b which is in front of it is cancelled. The rearmost sliding plate 10a is uncoupled from the drive. The sliding member 60a is locked in place in relation to the guide rail 22. Upon further displacement of the plates 10b to 10e rearwardly, a portion of the tongue 93 of the bolt engaging member 91a becomes positioned over the bolt member 89a. Consequently the bolt member 89a is maintained in engagement with the recess 129a (FIG. 31b).

Each of the plate carriers 56b to 56e carries a respective laterally projecting guide pin 82b to 82e at its free end. The guide pin 82b on the plate carrier 56b of the second rearmost sliding plate 10b co-operates with a guideway 131 which has a longitudinal portion 132 parallel with the guide rail 22 and a rearwardly and downwardly inclined portion 133 (FIG. 6b). Upon an initial displacement movement of the composite plate assembly 10a to 10e, the guide pin 82b runs along the longitudinal portion 132. Consequently, the plate 10b undergoes a translatory movement parallel with the guide rail 22. Once the plate 10a has been uncoupled from the drive in the above-described manner and is fixed in its extreme rear pushed-out or extended position, the guide pin 82b enters the sloping portion 133 of the link pin guideway 131. Consequently, upon further pushing of the plate 10b rearward, there is at the same time a pivoting of this plate about the axis 15b which is defined by the pivot bearing pin 56b. When the sliding plate 10b has reached its extreme position determined by the abutment 127b, it is parallel with the previously swung-out rearmost plate 10a. In this position, the plate 10b is uncoupled from the drive in the manner explained with reference to plate 10a, and is fixed into the recess 129b in the locking means 130 by introduction of the bolt member 89b. The tongue 93 of bolt engaging member 91b runs over the top of the bolt member 89b to keep it in place in the recess 129b.

The guide pins 82c, 82d and 83e co-operate with a guideway 135 which is rigidly connected with the guide rail 22 and therefore, with the roof (FIGS. 6a, 6b, 7 and 8). The guideway 135 extends parallel with the guideways 40a to 40d and continues, at 136, into the front end of the push-out guide member 115, and then merges into a rearwardly and downwardly inclined guideway portion 137. The guide pin guideway portion 137, in conjunction with the guide pins 82c, 82d and 82e, produces a pivoting of the sliding plates 10c, 10d and 10e into a position parallel with the extended plates 10a and 10b when the respective guide pins reach this portion during the course of rearward pushing of the remaining part of the composite plate assembly. The downwardly inclined guideway portion 137 is followed at the rear by a guide pin guideway portion 138 which is again parallel with the roof area, which makes it possible for the already fully extended sliding plates 10c and 10d to be displaced even a little further rearwardly until they are at a clearly defined distance from the already extended plates which are behind them. The guide pin 83e of the frontmost sliding plate 10e only reaches the frontmost end of the guide pin guideway portion 138.

Upon closure of the roof, the processes described above in respect to opening of the roof takes place logically in the reverse sequence. The connecting rod 101 is entrained by a form-locking connection between the abutment face 140 of the coupling member 39 and a matching abutment face 141 on the bolt member 98 (FIGS. 12a and 31b), until, during displacement, the bolt member 98 reaches a position over the recess 99 which is rigid with the frame and is pressed into the recess 99 by a vertical force component transmitted by the abutment faces 140, 141. Furthermore, the coupling member 39 has an abutment surface 142 which, upon displacement in the direction of closure, abuts a surface 143 (FIG. 1b) on the drive rod 64 in order to entrain it. The lifting lever 70 is in turn entrained by the drive rod 64 in the direction of closure via the bolt member 73 and the sloping abutment surface 144 of the recess 76. Upon closure, the bolt member 89d is moved upwardly via the sloping surface 128 so that the parts 91d and 85d are coupled in the opening direction. During the closing movement, then, an abutment surface 146 on the bolt engaging member 91e strikes an abutment surface 146 on the connecting rod 85d. Consequently, the sliding bearing 61e and the connecting rod 85d, along with the other sliding bearings with the plates mounted on them, are entrained in the direction of closure.

The parts 60, 61, 85 and 93 may possibly be integrated into one single component part.

Figure 21:
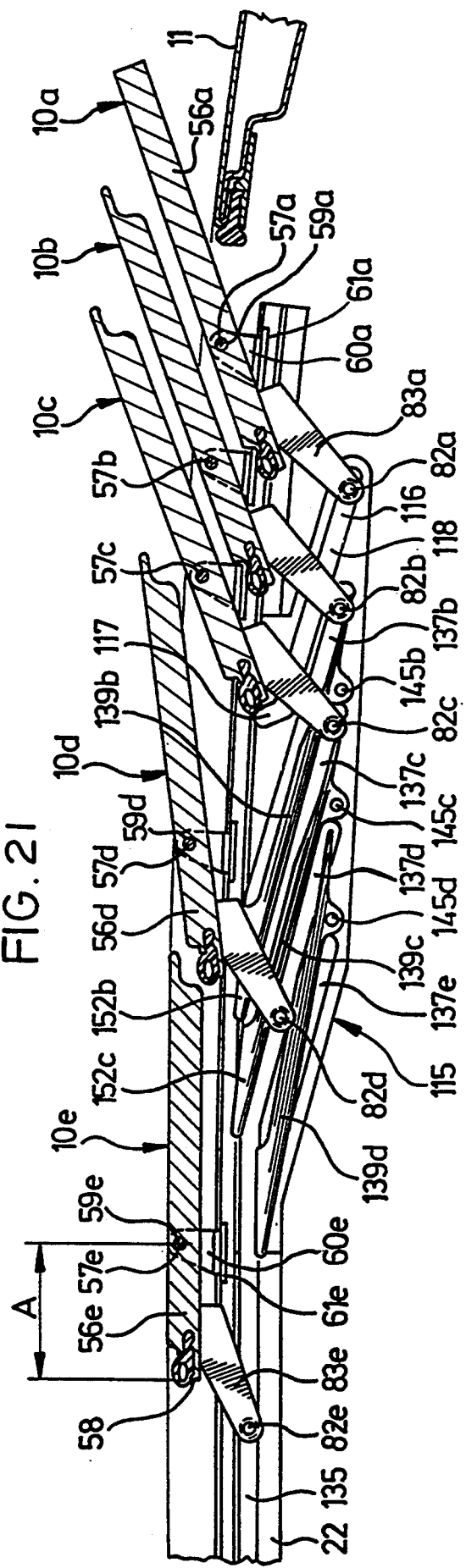
FIG. 21 is an enlarged, partial lengthwise section along line 21—21 of FIG. 3 in a partially open plate roof, in which the drip moldings assigned to the plates and the folding inside roof lining are left out for the sake of greater clarity.

FIG. 21 shows a modified form of the arrangement shown in FIG. 6 for guiding the displacement and swinging out of the plates 10a–10e. For simplicity and brevity, the same reference numerals have been retained for parts that correspond to those shown and described relative to the arrangement of FIG. 6 and the following comments will focus, for the most part, on the features that differ. In this arrangement, a push-out guide member 115 is still securely connected with the rear part of guide rail 22 and still comprises a guide slot 116 directed obliquely backward and downward, in which guide pin 82a engages. Likewise, plate carriers 56b to 56e comprise guide plates 83b to 83e and each carry a laterally projecting guide pin 82b to 82e on their free ends which slide in a common guideway 135 of guide rail 22 and guideways 137b to 137e formed in push-out guide member 115 and which branch off from common guideway 135 at a rearward and downward incline. These parts all function as already described.

However, in this case, a respective deflector 139b to 139d is assigned to each of the guideways 137b to 137d. A pivot pin 145b to 145d, which is mounted to pivot in a bearing aperture of push-out guide member 115, is attached to each of deflectors 139b to 139d. On each of pivot pins 145b to 145d, a leg spring (not shown) is slipped on, which prestresses the respective deflector 139b to 139d counterclockwise in FIG. 21. In this prestressed position, which is illustrated in FIG. 21 for deflector 139d, the deflector unblocks guideway 135 for the passage of the guide pins 82b to 82e.

In each of the lower guideways 40a to 40d of guide rail 22, a respective abutment 127a–127d is located, which determines the rear end position of the connecting rods 85a–85d detachably connecting slide bearings 61a to 61e. When sliding back the composite assembly, first the connecting rod between slide bearings 61a and 61b strikes the assigned abutment. By continued action of the drive force on the composite assembly, the drive connection between rearmost slide bearing 61a and slide bearing 61b lying in front of it is cancelled out. Rearmost sliding plate 10a is uncoupled from the drive. Slide member 60a is maintained stationary relative to guide rail 22. In the initial displacement movement of composite assembly 10a to 10e, guide pins 82b to 82e run along common guideway 135. Plates 10b to 10e are consequently displaced in a translatory manner parallel to guide rail 22. After plate 10a is uncoupled from the drive in the way explained above, guide pin 82b goes from guideway 135 into guideway 137b. As a result, with further lagging behind of plate 10b at the same time, a swiveling of this plate around swivel axis 15b, determined by pivot bearing bolt 57b, is forced. In doing so, if guide pin 82b approaches the rear end of guideway 137b, it strikes the rear lower end of deflector 139b which extends across its path in the prestressed position, as is shown for deflector 139d in FIG. 21. As a result, deflector 139b is swiveled in a clockwise direction in FIG. 21. This causes deflector 139b to close guideway 135 with its front upper end 152b while opening the guideway 137c. In this way, guideway 137b is blocked for preventing the entry of the guide pin of other plates, and insuring that, with further sliding back of the composite assembly, guide pin 82c of plate carrier 56c of the next plate 10c enters guideway 137c. This is correspondingly repeated for each of the other plates. When closing roof 9, the operations described above for the opening occur, correspondingly, in the opposite order.

The manner in which the penetration of rainwater or wash water into the vehicle interior is effectively prevented will now be described.

Figure 22:
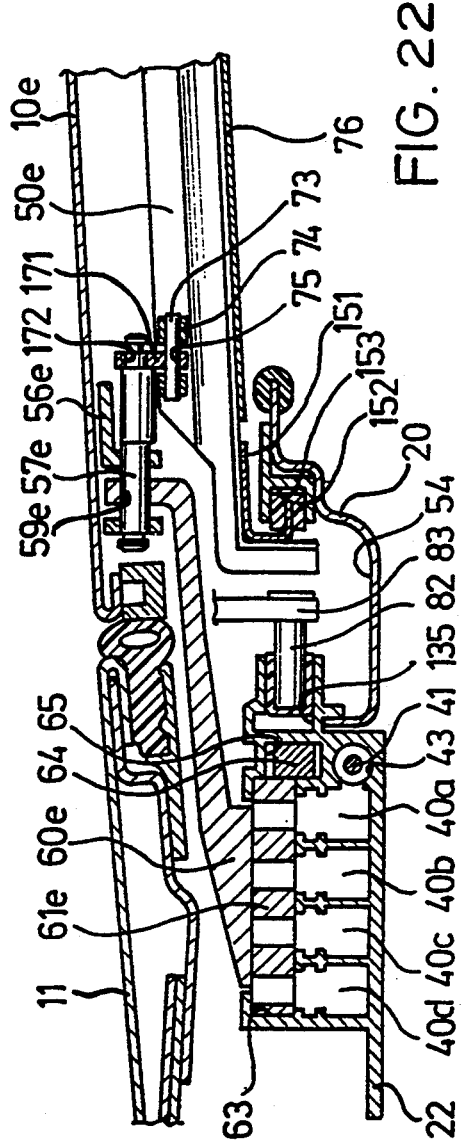
FIG. 22 is enlarged, partial cross-sectional view taken along line 22—22 of FIG. 3.
Figure 23:
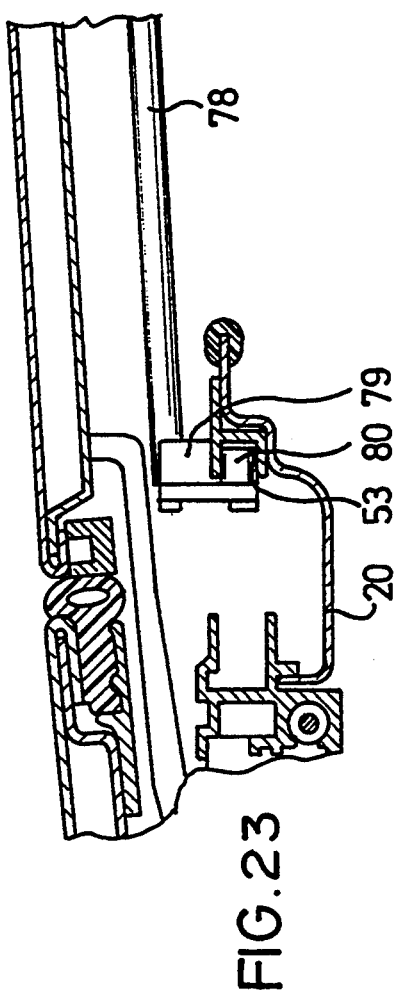
FIG. 23 is an enlarged, partial cross-sectional view taken along line 23—23 of FIG. 3.

Plates 10b to 10e are respectively connected with a drip molding 150b to 150e. These drip moldings take part only in the translatory movement of associated plates 10b to 10e and serve to collect water, which penetrates the sealing gap between adjacent plates when the roof closed is closed, or which drains from off of the plates at the front edge thereof when they are swung upwardly, and to discharge the water collected laterally to a drip molding 154, that forms part of roof frame 20 and which lies below guideways 153 and 135. In each position of the respective plate 10a-10e, one of the drip moldings 150b to 150e lies under the front edge 58 of the respective plate, (the front edge being lower than the rear edge when the plate has been swung upwardly) as can be seen from FIGS. 24a, 24b, 25 and 26. Drip moldings 150b to 150e are connected on each of their laterally outer ends by a respective guide shoe carrier 151. On guide shoe carrier 151, guide shoes 152 are slipped on which are guided to slide along a guideway 153. Guideway 153 extends parallel to guideways 40, 63 and 135; it lies at section 22—22 of FIG. 3 at the same height as guideway 135 of guide pins 82 (FIG. 22).

For mutual connection of the plates 10b-10e and the slidable drip moldings 150b-150e, in the illustrated embodiment, levers 171 are provided on both ends of drip moldings 150b-150e. These levers 171, on the one hand, are hinged to the respective plate or its mounting and, on the other hand, to the drip molding. In the present case, pivot bearing pins 57b to 57e penetrate a bearing opening 172 made on the rear end of respective lever 171 at an inner end thereof which lies away from the respective bearing aperture 59a to 59e. A pivot bearing pin 173 is held by a bearing block 174 molded on drip molding 150b to 150e and it extends through a bearing opening 175 on the front end of lever 171.

Instead of lever 171 being hinged with the plates and the drip moldings, flexible elements can be used for connecting of the plates and drip moldings.

On drip moldings 150b to 150e, a folding inside roof lining 176, made of fabric or the like, is attached. This roof headliner is connected, in the illustrated embodiment, with the underside of the drip moldings in a flat manner, for example, is glued thereto (FIG. 22 and 26). The inside roof lining 176 extends under the flat composite assembly, and when opening the roof, is placed in folds 177 during the combined sliding and swiveling movements of individual plates 10b to 10e. In this way, the inside roof lining 176 conceals the plates, the drip moldings and the related mechanical parts from the vehicle interior in each opening and closing position of the roof.

In the illustrated embodiment, three rods 178 are connected with inside roof lining 176, each of which is placed between a pair of successive drip moldings. These rods extend parallel to the drip moldings 150b to 150e, and they are slidable as a function of the opening and closing movements of the plates. For this purpose, both ends of the rods 178 are braced on a rod carrier 179, which has sliding blocks 180 on its lower end, which are guided to slide in guideway 153. Rods 178 impose an additional folding on inside roof lining 176, whereby the fold height, and thus the overall structural height of the system, is reduced. As can be seen especially from FIG. 24a and 26, the inside roof lining material forms pockets which accommodate the rods 178 at the top side of the folding inside roof lining 176. Pocket edges 181 extend basically perpendicularly downward, by which a cleaner folding is supported (FIG. 24b).

The area of roof opening 13, in which plates 10a to 10e are slid together with the roof open (FIGS. 2 and 25) is concealed from below by a stationary covering 185, which is part of the roof frame 20 and which forms the rear edge 186 of the frame aperture 21. On the underside of covering 185, there is located an inside roof lining part 187 that is integrally joined with the roof.

Figure 27:
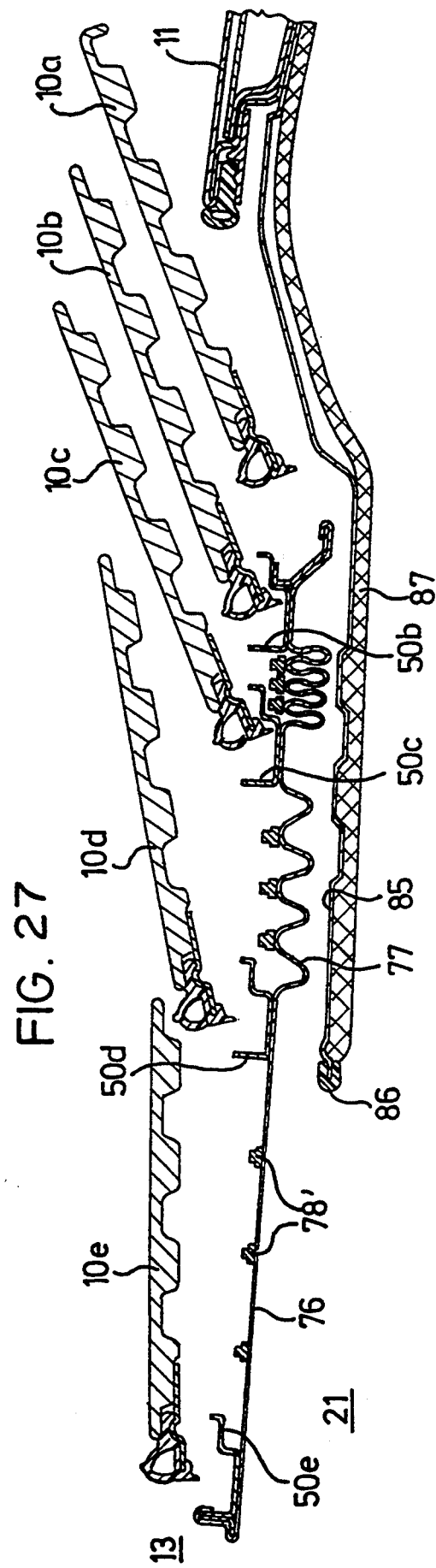
FIG. 27 is a partial lengthwise section of a modified embodiment of the plate roof in a partially open position.

The front edge of folding inside roof lining 176 lies around a projecting flange 188 of the drip molding 150e which is frontmost in the lengthwise direction of the vehicle. The rear edge of the inside roof lining 176 engages around an extension arm 189, which projects backward and downward from the drip molding 150b which is rearmost in the lengthwise direction of the vehicle. With a closed roof (FIGS. 24a and 24b), inside roof lining 176, in this way, covers frame aperture 21 up to an inside roof lining part 191 that can be placed below wind deflector 16 and swung out together with the wind deflector. When the roof is fully opened (FIGS. 25 and 26), folding inside roof lining 176 disappears behind covering 185. The area of the folds of inside roof lining 176 is concealed by covering 185 in all cover positions. Consequently from the interior of the vehicle, only the fold-free extended zone of the inside roof lining 176 can be seen. The latter can be seen especially clearly from FIG. 27, which shows a modified embodiment of the roof where profiled rods 178' are attached at their underside to the inside roof lining, e.g., by being glued thereto.

Since covering 185 is located under the gap between both plates 10a and 10b also when the roof is closed, no drip molding needs to be applied to the rearmost plate 10a.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Vehicle roof with a series of strip-like plates for closing and at least partially opening a roof opening in a fixed roof surface, said plates adjoining one another, in a closed position, in a manner forming a flat composite plate assembly in which interconnections are formed between adjoining plates, and said plates being guided along first guideways which form part of a guide means for causing the flat composite plate assembly to perform a translatory movement, in a longitudinal direction of the roof and crosswise relative to lengthwise edged of the strip-like plates, and means for producing an upward pivoting of each plate during said translatory movement, each of the interconnections being disconnected by said upwardly pivoting of each plate in an opening direction on a sequential, plate-by-plate, basis when opening the roof and each interconnection being restored in a reverse manner when closing the roof; wherein a drip molding is hinged to a respective plate of at least some of the plates; and wherein said drip moldings are guided to slide along second guideways so as to follow only the translatory movements of the respective plate in said longitudinal direction of the roof in a manner causing the drip moldings, in each position of the respective plate, to lie under a lengthwise edge of the respective plate which extends crosswise to said longitudinal direction of the roof and which, when the respective plate is pivoted upward, is lower than the other lengthwise edge of the respective plate.

2. Vehicle roof according to claim 1, wherein opposite ends each of the drip moldings are connected to the respective plate by a lever which is pivotally connected relative to both the respective plate and the drip molding.

3. Vehicle roof according to claim 1, wherein a folding inside roof lining is attached on said drip moldings so as to extend under the flat composite plate assembly in a manner causing said roof lining to fold between successive drip moldings when opening the roof by the combined effects of said sliding and pivoting movements of the individual plates.

4. Vehicle roof according to claim 3, wherein the folding inside roof lining is connected in a flat manner with the underside of drip moldings.

5. Vehicle roof according to claim 3, wherein at least one rod extending parallel to the drip moldings and connected with the inside roof lining is placed between each pair of successive drip moldings; and wherein the rods are supported so as to be slidable along said second guideways as a function of the opening and closing movements of the plates and create additional folds on the inside roof lining.

6. Vehicle roof according to claim 2, wherein the first guideways for the plates and the second guideways for the drip moldings are integrally connected with the fixed roof surface.

7. Vehicle roof according to claim 3, wherein an area of the roof opening in which the folds of the inside roof lining are formed is covered from below by a cover.

8. Vehicle roof according to claim 7, wherein the cover is part of a roof frame which is mounted under the roof opening and carries said first guideways for the plates and second guideways for the drip moldings.

9. Vehicle roof according to claim 8, wherein the folding inside roof lining, when the roof is open, is substantially hidden behind the cover and when the roof is closed, the folding inside roof lining covers a frame opening defined by the roof frame.

10. Vehicle roof according to claim 1, wherein each of the strip-like plates is guided along said first guideways by guide support means that are pivotally connected thereto at first and second guide locations, said first and second guide locations being spaced apart from each other in the longitudinal direction of the roof, and said upward pivoting occurring at at least one of said guide locations; and wherein means is provided for maintaining each said guide support means in engagement with the first guideways over the entire range of movements of the plates.

11. Vehicle roof with a series of strip-like plates for closing and at least partially opening a roof opening in a fixed roof surface, said plates adjoining one another, in closed position, in a manner forming a flat composite plate assembly in which interconnections are formed between adjoining plates, and said plates being guided along first guideways which form part of a guide means for causing the flat composite plate assembly to perform a translatory movement, in a longitudinal direction of the roof and crosswise relative to lengthwise edges of the strip-like plates, and means for producing an upward pivoting of each plate during said translatory movement, each of the interconnections being disconnected by said upwardly pivoting of each plate in an opening direction on a sequential, plate-by-plate basis when opening the roof and during which each interconnection is restored in a reverse manner when closing the roof; wherein each of the strip-like plates is guided along said first guideways by guide support means that are pivotally connected thereto at first and second guide locations, said first and second guide locations being spaced apart from each other in the longitudinal direction of the roof, and said upward pivoting occurring at at least one of said guide locations; and wherein means is provided for maintaining each said guide support means in engagement with the first guideways over the entire range movements of the plates.

12. Vehicle roof according to claim 11, wherein the guide support means comprise sliding members mounted for displacement along guides of the first guideways at the first of said guide locations; and wherein the upward pivoting of each plate is about a pivot axis which extends transversely to the direction of said translatory movement of the plates and takes place about respective sliding members.

13. Vehicle roof according to claim 12, wherein the pivot axes of the plates are offset away from a plate edge thereof which is frontmost during closing of the roof.

14. Vehicle roof according to claim 11, wherein, at the second guide locations, the guide support means of each plate co-operate with respective pivot guideways, the movement of the movement of the guide support means along at least a portion of their respective pivot guideways causing the said pivoting of the plates about their pivot axes.

15. Vehicle roof according to claim 14, wherein said portion of each said pivot guideway is directed so that the plates, in a fully pivoted state thereof, are inclined substantially parallel to each other.

16. Vehicle roof according to claim 11, wherein the second guide locations of each plate are offset below the first guide locations in a closing direction of the plate.

17. Vehicle roof according to claim 11, wherein the said guide support means, at each second guide location, comprises a guide pin mounted on a guide member which is rigidly connected to the respective plate, said guide member projecting obliquely downwardly from the associated plate in a direction toward a closed position of the plate.

18. Vehicle roof according to claim 12, further comprising drive means for moving the plates, said drive means being coupled to all the plates when in the closed position; wherein a coupling and recoupling means is providing which, on opening the roof, uncouples the plates from the drive means one after another during the disconnecting of the flat composite plate assembly, and which recouples the plates to the drive means, one after another, on closing the roof during the restoration of the composite plate assembly.

19. Vehicle roof according to claim 18, wherein a lifting member is provided for a leading one of the plates in a direction of opening movement, the lifting member being capable of pivoting this plate about a pivot axis which remains stationary in relation to the first guideway during pivoting.

20. Vehicle roof according to claim 19, wherein the lifting member is coupled to the drive means and guided for displacement along a a slideway, the displacement of the lifting member along the slideway pivoting the leading plate from a closed position to a partially extended position in which the plate can be moved in relation to the first guideway.

21. Vehicle roof according to claim 20, wherein the interconnection of the plates when the roof is closed is produced in a form-locking manner by longitudinally displaceable connecting rods and associated coupling means so that, upon opening the closed roof, the plates are disconnected from each other in turn, starting with a leading pair of plates toward an open position, and so that, upon closing of the opened roof, the plates are engaged with one another, starting with a leading pair of plates toward a closed position.

22. Vehicle roof according to claim 4, wherein, in order to disconnect the plates from their associated coupling means and thereby their associated connected rods, abutments are provided that are rigidly connected with the roof surface, the disengagement of the coupling means from its associated plate being caused by the striking of the respective connecting rod with a respective one of said abutments.

23. Vehicle roof according to claim 22, wherein said guide means is provided with a means for separately coupling the leading plate to the drive means at its said first guide locations when the leading plate is displaced toward the closed position.

24. Vehicle roof according to claim 11, wherein said guide means is provided with means for locking the plates in position in relation to the guides at said first guide locations when the roof is in the closed position.

25. Vehicle roof according to claim 11, wherein the plates are each locked in relation to the first guideway when the plate has reached its respective fully pivoted upward position.

26. Vehicle roof accorrding to claim 11, wherein in the region of a front end of the roof opening, a wind deflector is provided which, in an inoperative position, lies adjacent to the flat composite plate assembly in its closed position.

27. Vehicle roof according to claim 26, wherein the wind deflector is coupled to the drive means for moving of the plates as a means for displacement of the wind deflector between its operative position and an extended operating position.

28. Vehicle roof according to claim 27, wherein bolt member shift couplings are provided to separately connect the wind deflector and the plates to the drive means.

29. Vehicle roof according to claim 28, wherein the drive means comprises drive cables connected to a drive unit.

30. Vehicle roof according to claim 29, wherein the drive cables are screw-threaded cables.

31. Vehicle roof according to claim 11, wherein said guide support means comprise sliding members, each of the plates being pivotally mounted on a pair of said sliding members to rotate about a pivot axis which extends crosswise to a direction of displacement of the plates at one of their guide locations, and to slide along longitudinal guides of said first guideway that are rigidly connected with the roof.

32. Vehicle roof according to claim 31, the pivot axes of the plates are offset in the direction of opening in relation to an edge of the respective plate which is at the front in a direction toward a closed position.

33. Vehicle roof according to claim 11, wherein a common drive means is provided for movement of all of the plates.

34. Vehicle roof according to claim 33, wherein a leading plate in the direction toward the closed position is separably coupled to the drive means.

35. Vehicle roof according to claim 31, wherein, when the roof is closed, the sliding members are locked in relation to the longitudinal guides of the first guideway.

36. Vehicle roof according to of claim 35, the sliding members of each of the plates are locked in respect to the longitudianal guides of the first guideway which are rigidly connected with the roof, when the respective plate has reached its fully extended position.

37. Vehicle roof according to claim 33, where the common drive comprises drive cables which are drivingly connected to a drive unit.

* * * * *